(12) United States Patent
Suba et al.

(10) Patent No.: US 8,010,416 B2
(45) Date of Patent: Aug. 30, 2011

(54) APPARATUS, SYSTEM AND METHOD FOR EXCHANGING LEAD INFORMATION

(75) Inventors: Romy R. Suba, Brooklyn, NY (US); Sebastiano Vitelli, Jr., Holbrook, NY (US); Stephen E. Virgilio, Bay Shore, NY (US); Brett Gmoser, Farmingdale, NY (US); Devlin P. Kiernan, Islip, NY (US)

(73) Assignee: Lead Bid, Inc., Islip, NY (US)

( * ) Notice: Subject to any disclaimer, the term of this patent is extended or adjusted under 35 U.S.C. 154(b) by 23 days.

(21) Appl. No.: 12/268,586

(22) Filed: Nov. 11, 2008

(65) Prior Publication Data

US 2009/0138378 A1    May 28, 2009

Related U.S. Application Data

(60) Provisional application No. 60/987,346, filed on Nov. 12, 2007.

(51) Int. Cl.
*G06Q 30/00* (2006.01)
(52) U.S. Cl. .................................................... 705/26.3
(58) Field of Classification Search ................ 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| 7,321,858 | B2 * | 1/2008 | Andino et al. ................... 705/12 |
| 7,546,243 | B2 * | 6/2009 | Kapadia et al. .................... 705/1 |
| 7,630,933 | B2 * | 12/2009 | Peterson et al. ................ 705/38 |
| 7,647,274 | B2 * | 1/2010 | Peterson et al. ................ 705/38 |
| 2004/0143482 | A1 * | 7/2004 | Tivey et al. ...................... 705/10 |
| 2005/0131760 | A1 * | 6/2005 | Manning et al. ................. 705/14 |
| 2006/0195385 | A1 * | 8/2006 | Khetrapal et al. .............. 705/37 |
| 2007/0168278 | A1 * | 7/2007 | Peterson et al. ................ 705/38 |
| 2008/0201202 | A1 * | 8/2008 | Rose et al. ....................... 705/10 |

OTHER PUBLICATIONS

Paul B. Baron, "Managing Prospective Franchise Leads", Franchising World, Aug. 2006.*

* cited by examiner

*Primary Examiner* — Naeem Haq
(74) *Attorney, Agent, or Firm* — The Law Offices of Anthony L.Meola

(57) ABSTRACT

An apparatus, system and method is described for exchanging lead information in a bid process that provides end users, consumers, lead buyers, aggregators and sellers that aggregate the leads through marketing a platform to bid on the leads based on pre-determined criteria such as zip code, buy price field, etc without having duplicate lead information pass to any one entity.

16 Claims, 20 Drawing Sheets

TAKE CONTROL.
MAXIMIZE PROFITS.

1720  SELLER HOMEPAGE

RECENT ACTIVITY

|  | YT | MTD | YTD |
|---|---|---|---|
| LEADS SOLD | 0  0 | 0 | 1 |
| LEADS OFFERED | 0  0 | 0 | 42 |
| TOTAL LEAD EARNINGS | ND ND | ND | $12.80 |
| AVG. LEAD PRICE | ND ND | ND | $12.80 |

MY PROFILE

ACCOUNT INFORMATION
DEMO DEMO
LEAD BID, INC.
61 OCEAN AVENUE S.
ISLIP, NY 11751
PHONE (631) 406 - 7170      1725

QUICK LEAD SEARCH                                        SUBMIT

PERSONAL DETAILS
SSN:[    ]  FIRST NAME:[    ]  LAST NAME:[    ]

LOCATION & TIME
SEARCH WITHIN[    ] OF [    ]  START DATE:[  ][  ][  ]  END DATE:[  ][  ][  ]
              (MILES)  (ZIP CODE)    (MONTH)(DAY)(YEAR)        (MONTH)(DAY)(YEAR)

LEAD IDENTIFICATION
YOUR CAMPAIGN ID:[    ]  YOUR LEAD ID:[    ]  LEADBID LEAD ID:[    ]

1720  RECENT LEADS
THE MOST RECENT LEADS THAT YOU HAVE SOLD.                          1710

| LEAD ID | DATE | USER | SSN | FULL NAME | TYPE | PRICE |
|---|---|---|---|---|---|---|
| EL0PG8190SLZ829M | 04/28/2008 | 4076-47 | 558-60-7678 | ENOCH AMATO | SELLER | $12.80 |

VIEW ALL SOLD LEADS

TAKE CONTROL
MAXIMIZE PROFITS.

REPORTING

TIME PERIOD: THIS MONTH - NOVEMBER    REPORT TYPE: BUYING AND SELLING   TYPE: ALL TRANSACTIONS   [SEARCH]

| DATE AND TIME | TRANSACTION ID | TYPE | USER | AMOUNT | BALANCE |
|---|---|---|---|---|---|
| NOV 5TH, 2008 02:54PM EST | 33UW2VL3440DFYW2 | PURCHASE | 8753-74 | -$15.00 | $1849.80 |
| NOV 5TH, 2008 02:54PM EST | H6CHX6RZ459K1H5L | PURCHASE | 8753-74 | -$15.00 | $1864.80 |
| NOV 5TH, 2008 02:54PM EST | 3B40LFJ4ZC0U2UOJ | PURCHASE | 8753-74 | -$15.00 | $1879.80 |
| NOV 5TH, 2008 02:54PM EST | YAJMZE5W376YKD79 | PURCHASE | 8753-74 | -$15.00 | $1894.80 |
| NOV 5TH, 2008 02:54PM EST | 9K5C02TC5F9WML33 | PURCHASE | 8753-74 | -$15.00 | $1909.80 |
| NOV 5TH, 2008 02:54PM EST | 2CR56811612F3228M | PURCHASE | 8753-74 | -$15.00 | $1924.80 |
| NOV 5TH, 2008 02:54PM EST | LMG1J3CLLT8A02UK | PURCHASE | 8753-74 | -$15.00 | $1939.80 |
| NOV 5TH, 2008 02:54PM EST | F268L730P95RR2M0 | PURCHASE | 8753-74 | -$15.00 | $1954.80 |
| NOV 5TH, 2008 02:54PM EST | P97T3068E6KT99U6 | PURCHASE | 8753-74 | -$15.00 | $1969.80 |
| NOV 5TH, 2008 02:54PM EST | 41DO66M7DWFCD98Y | PURCHASE | 8753-74 | -$15.00 | $1984.80 |
| NOV 5TH, 2008 02:54PM EST | JLOYX449IESHY9PX | PURCHASE | 8753-74 | -$15.00 | $1999.80 |
| NOV 5TH, 2008 02:54PM EST | 85V745GUJIXY19H9 | PURCHASE | 8753-74 | -$15.00 | $2014.80 |
| NOV 5TH, 2008 02:54PM EST | 4K8JO2OG8SAO0960 | PURCHASE | 8753-74 | -$15.00 | $2029.80 |
| NOV 5TH, 2008 02:54PM EST | N2SEJ12M90VXF61Z | PURCHASE | 8753-74 | -$15.00 | $2044.80 |
| NOV 5TH, 2008 02:54PM EST | T49517470KNJG697 | PURCHASE | 8753-74 | -$15.00 | $2059.80 |
| NOV 5TH, 2008 02:54PM EST | G10A207HS55L93I3 | PURCHASE | 8753-74 | -$15.00 | $2074.80 |
| NOV 5TH, 2008 02:54PM EST | 08A1A9Z591DEL6NM | PURCHASE | 8753-74 | -$15.00 | $2089.80 |
| NOV 5TH, 2008 02:54PM EST | 3W94V8BY0VYQ83S6 | PURCHASE | 8753-74 | -$15.00 | $2104.80 |
| NOV 5TH, 2008 02:54PM EST | XLP7945BT7QZQ3AK | PURCHASE | 8753-74 | -$15.00 | $2119.80 |
| NOV 5TH, 2008 02:54PM EST | 9VEVM6H4OJ8XSPNL | PURCHASE | 8753-74 | -$15.00 | $2134.80 |
| NOV 5TH, 2008 02:54PM EST | 9N1QH5J3N18G7QV7 | PURCHASE | 8753-74 | -$15.00 | $2149.80 |
| NOV 5TH, 2008 02:54PM EST | E73L713QMB1SXU7M | PURCHASE | 8753-74 | -$15.00 | $2164.80 |
| NOV 5TH, 2008 02:54PM EST | 1V507FCO326P8QYY | PURCHASE | 8753-74 | -$15.00 | $2179.80 |
| NOV 5TH, 2008 02:54PM EST | IW215GW13I0IEH33 | PURCHASE | 8753-74 | -$15.00 | $2194.80 |
| NOV 5TH, 2008 02:54PM EST | 16J7KM8L5A3DJPT0 | PURCHASE | 8753-74 | -$15.00 | $2209.80 |
| NOV 5TH, 2008 02:54PM EST | 5815Y3SW127NZC09 | PURCHASE | 8753-74 | -$15.00 | $2224.80 |
| NOV 5TH, 2008 02:54PM EST | 50B89QU92M7Z9D8Z | PURCHASE | 8753-74 | -$15.00 | $2239.80 |
| NOV 5TH, 2008 02:54PM EST | Q4Q4MW60463U7L1A | PURCHASE | 8753-74 | -$15.00 | $2254.80 |
| NOV 5TH, 2008 02:54PM EST | 47YU3VE7Y0ZYLUG7 | PURCHASE | 8753-74 | -$15.00 | $2269.80 |
| NOV 5TH, 2008 02:54PM EST | BXNKWB68W3MWQCT1 | PURCHASE | 8753-74 | -$15.00 | $2284.80 |

ACCOUNT BALANCE: $1849.80

APPARATUS, SYSTEM AND METHOD FOR EXCHANGING LEAD INFORMATION

CROSS REFERENCE TO RELATED APPLICATIONS

This application incorporates by reference in its entirety and takes priority from U.S. Provisional Patent Application Ser. No. 60/987,346 entitled "AN APPARATUS, SYSTEM AND METHOD FOR EXCHANGING LEAD INFORMATION", filed Nov. 12, 2007.

BACKGROUND OF THE INVENTION

1. Field of the Present Invention

The present invention relates generally to an apparatus, system and method for internet based commerce for exchanging sales lead information in a bid process while preventing duplicate leads from being passed from one party to another.

2. Description of the Related Art

In prior art systems buyers and sellers are linked together to allow buyers to purchase lead information for individuals in the sub-prime credit application category. Information is exchanged, for example, in the auto industry, by buyers purchasing lead information from multiple third part sellers.

However, current systems have a deficiency in that duplicate lead information is prevalent, which increases cost and administrative time. Current systems do not provide the ability to cross reference lead information to prevent duplicate leads from passing to buyers, hence costing the buyer unnecessary fees for stale or repeat information.

What is needed is a wholesale auction platform that prevents duplicate lead information. Since many lead buyers have contractual agreements with multiple lead providers, a problem that many face is that they will be receiving the same lead information more than once, each time from a different provider. There is a need to solve this problem for the buyer by mandating that the seller uses a specific platform to sell leads to the buyer. For each lead that any seller wants to sell the lead buyer, there is a need for an invention that uses a duplication check process to ensure the information contained in the lead has not already been bought by the buyer.

SUMMARY OF THE INVENTION

An apparatus, system and method for exchanging lead information in a bid process that provides end users, consumers, lead buyers and aggregators and sellers that aggregate the leads through marketing so the buyers can bid on the leads based on pre-determined criteria such as zip code, buy price field, etc, all without receiving duplicate lead information.

In a first aspect, the present invention includes a system for exchanging lead information in a bid process including three major modules:

1. Lite Dealer Account Module: A major problem in the lead industry is lead buyers receiving duplicate leads from multiple providers. There exists a need to alleviate this problem at the source. The so-called "Lite Dealer Account" ensures that end-user lead buyers do not receive duplicate leads by mandating that the seller of the lead sells the lead directly to the end user via a specific platform. The present invention uses various methods to ensure that each lead sold to each buyer is not a lead that they have previously purchased.

2. Full Dealer Account Module: End users may sign up for the Wholesale Auction Platform. Since they are end users and not technology companies, they do not have the technology to bid on and receive leads in real time. An "Auto Bid" process is created, where the end users choose which types of leads they would like to receive, and the price they would like to pay for them. The present invention includes processes that then place a bid on their behalf when a lead which they have indicated they have interest in becomes available for sale on the Wholesale Auction Platform.

3. Wholesale Auction Platform Module: The wholesale auction platform is a real-time auction platform that connects lead sellers with lead buyers. When a lead is presented to a lead purchase web site for sale on the platform, the platform notifies all potential buyers, and automatically places bids for Full Dealer Accounts.

In a second aspect, the present invention includes a method for exchanging sales lead including collecting lead information for at least one buyer, including gathering and storing product information and buyer information; identifying at least one seller based upon a first set of predetermined criteria; transferring seller lead information to buyer; and providing the least one with seller information.

In a third aspect, the present invention includes a method for exchanging sales leads, the method including, selecting at least one buyer from a group of potential buyers, collecting lead information for the selected buyer, including gathering and storing product information and buyer information, verifying the lead information for the selected buyer, determining whether the lead information is duplicative, identifying at least one seller based upon a first set of predetermined criteria, transferring seller lead information to the at least one buyer; and providing the selected buyer with seller information.

In some embodiments the present invention includes determining whether the selected buyer has a relationship with the seller and whether the seller has elected to not conduct business with the selected buyer.

In some embodiments the present invention includes selecting at least one buyer from a group of potential buyers includes determining whether each of the potential buyers has an active profile, whether each profile for each of the potential buyers contains bid criteria matching the seller and for the group of potential buyers, determining which buyer bid criteria contains a highest bid.

In some embodiments the present invention includes weighting each of the potential buyers contains bid criteria.

In some embodiments the present invention verifying the lead information includes determining whether lead constraint rules have been applied to the lead information.

In some embodiments the present invention determining whether the lead information is duplicative includes determining whether the lead information is either PING data or POST data.

In some embodiments the present invention includes determining whether a social security for the buyer matches another lead and when POST data is determined, determining whether an email address or a home telephone number for the buyer matches another lead.

In some embodiments the present invention includes rating the seller, buyers and the lead information and returning process information to the seller.

In some embodiments the present invention includes parsing the lead information into a POST rule file for each selected buyer and determining, for each POST rule, whether the POST rule has an alias.

In some embodiments the present invention includes determining, for each POST rule, whether the POST rule has a constant rule or whether the POST rule is a regular expression.

In a fourth aspect the present invention includes an apparatus for exchanging sales leads, the apparatus consisting of a computer system having a hard drive, a microprocessor and a graphical user interface, the apparatus including an internet based software application stored on the hard drive, the internet based software application for facilitating interactions between users and the apparatus, a login module communicatively coupled to the internet based software application, where the login module contains a security element for allowing authorized users to access the apparatus, an administration module communicatively coupled to the internet based software application, where the administration module contains a software programmed to service internet web pages relating to the administration of the apparatus, a bid module communicatively coupled to the internet based software application, the bid module structured and arrange to accept incoming bids from users, a profiles module communicatively coupled to the internet based software application, the profiles module for storing and modifying user profiles on the hard drive, a buyer module communicatively coupled to the internet based software application, the buyer module for providing web content for users, a seller module communicatively coupled to the internet based software application, the seller module for providing web content for sellers, a search module communicatively coupled to the internet based software application, the search module accessible by buyers and sellers and allowing such buyers and sellers to search the hard drive for information about each other;

a transaction module communicatively coupled to the internet based software application, the transaction module for storing transaction related information on the hard drive and a lead module communicatively coupled to the internet based software application, the lead module containing lead content displayable to the buyers and sellers.

In some embodiments the present invention includes markets module communicatively coupled to the internet based software application, the markets module for providing market research data to users.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIG. 13 is a web site screen shot showing a buyer home according to one embodiment of the present invention;

FIG. 17 is a another web site screen shot showing a seller home page according to one embodiment of the present invention;

FIG. 19 is another web site screen shot showing a transaction history page according to one embodiment of the present invention.

DETAILED DESCRIPTION OF THE PREFERRED EMBODIMENTS

Figure 1A:
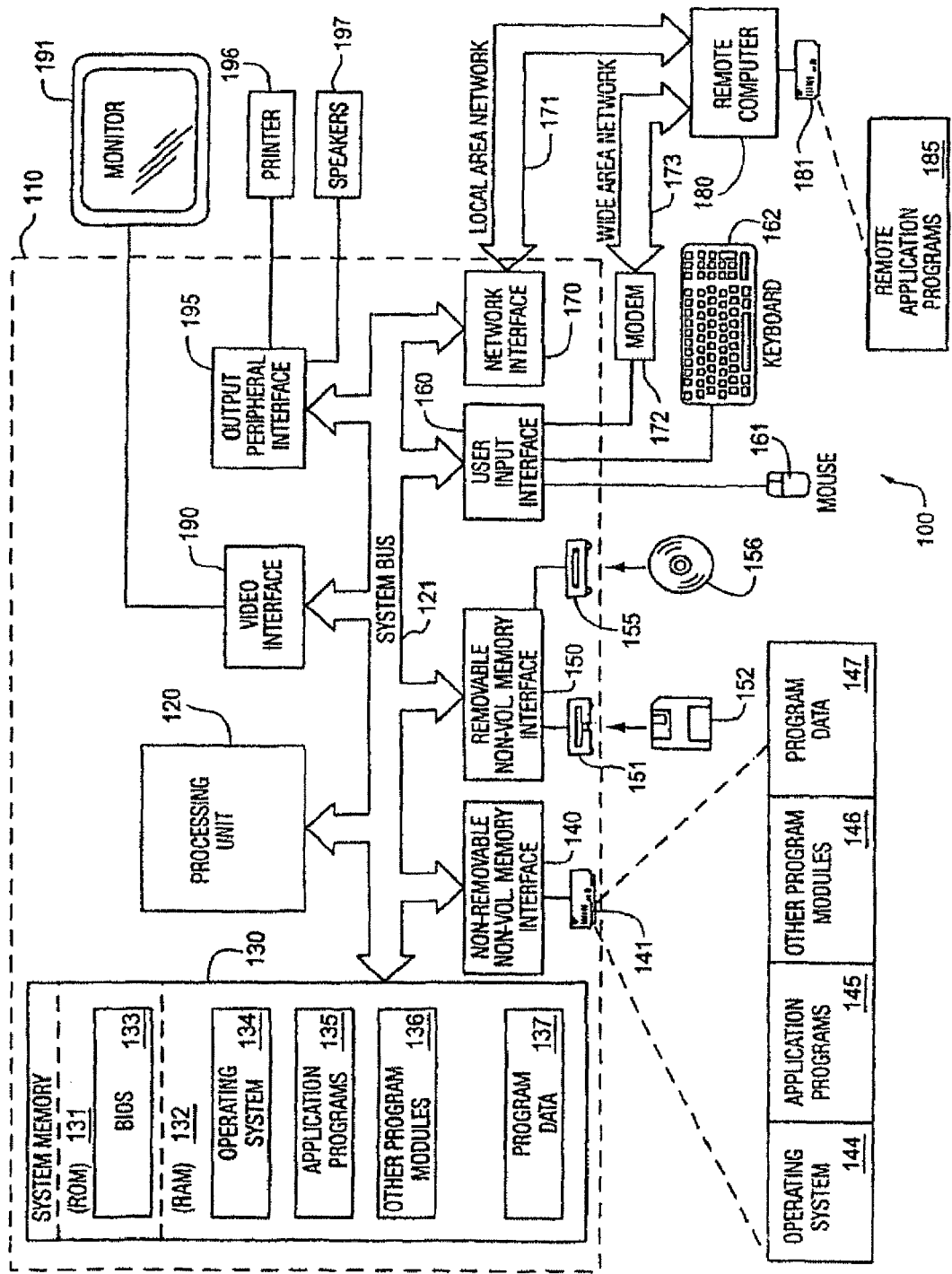
FIG. 1A is a block diagram of an exemplary computing environment in which aspects of the present invention may be implemented.

The present disclosure will now be described more fully with reference to the Figures in which an embodiment of the present disclosure is shown. The subject matter of this disclosure may, however, be embodied in many different forms and should not be construed as being limited to the embodiments set forth herein. The present invention shall be considered in light of the following defined terms of art:

Lead. The most basic description of a Lead is data about a consumer who has expressed interest in buying a product. In this connection the present invention is designed to service consumers searching for various products, which products may include (but is not limited to) the following:

Auto Loan;
Life Insurance Policy;
Payday Loan;
Credit Card;
Mortgage;
Property and Casualty Insurance; or
Automotive Insurance.

Lead Applicant/Consumer. The consumer that is interested in purchasing a product. Their information is contained in the lead, which is being processed within the present invention. The Lead Generator (defined below) usually obtains the consumer's information by having them fill out an application.

Application. A form, usually maintained by the Lead Generator, which a consumer fills out, thus indicating their interest in purchasing a particular product, Lead Data. The data about the consumer contained in the lead data. The data includes a full name, contact methods, employment information, information about their income, and in some cases, their Social Security number. The lead data, once it has been stored in the system, has a unique Lead ID Number associated with it.

Lead ID Number. When a lead is submitted into the system, it is assigned a unique ID code, consisting of ten random letters and numbers. This is done in order to obfuscate the actual ID number, which to tech-savvy Information Technology personnel will represent itself as an auto-incrementing integer, which would provide clues about sale statistics consistent with the present invention (such as the number of sales processed in a given period).

Target Audience. The present invention is designed to service the lead industry. The industry is comprised of three types of parties including Lead Generators, Lead Wholesalers, and Lead Buyers.

Lead Provider. This category is comprised of the following:

Lead Generator. Referred to in the present invention as a "Seller", Lead Generators utilize a myriad of methods to generate leads, with the intent to sell those leads to Lead Wholesalers and Lead Buyers. The present invention provides an open marketplace on which they are able to sell those leads.

Lead Wholesaler. Referred to in the present invention as both a "Seller" and "Buyer" (they may participate in either the buying or selling process), Lead Wholesalers typically buy leads in bulk from Lead Generators with the intention of ultimately selling them, in some cases exclusively, to a Lead Buyer.

Lead Buyer. A Lead Buyer is ultimately the "end user" of a sales lead which was originally generated by a Lead Generator. They are referred to in the present invention as the "Buyer". Their goal is to use the information in the lead to sell the consumer whatever product they may have been interested in.

XML Data. XML (Extensible Markup Language) is a general-purpose markup language used, in the context of the platform for the present invention, to convey a set of information about a lead applicant.

UWL Encoded Data. The encoding of data fields which convey a set of information about a lead applicant such that it can be used in the POST mechanism of an HTTP communication, according to RFC 3986.

Lead Bid Web Site. The front-end Internet interface for the platform of the present invention that includes both buyers and sellers.

Partnership. The present invention enables buyers and sellers to choose which parties they would like to do business with. The present invention will never present an opportunity to purchase a lead to a buyer who has elected not to do business with that seller.

Lite Dealer Account services Lead Buyers. Lead Buyers typically have a contractual agreement with any number of Lead Wholesalers or Lead Generators. This agreement normally specifies any or all of the following criteria:

1. How many leads the buyer wishes to purchase on a daily or monthly basis;
2. Which types of leads the buyer is interested in (automotive, insurance, etc.);
3. The geographical location of the consumer; and
4. The income level of the consumer.

FIG. 1A

FIG. 1A and the following discussion are intended to provide a brief general description of a suitable computing environment in which an exemplary embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an exemplary embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1A thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1A, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

Figure 2:
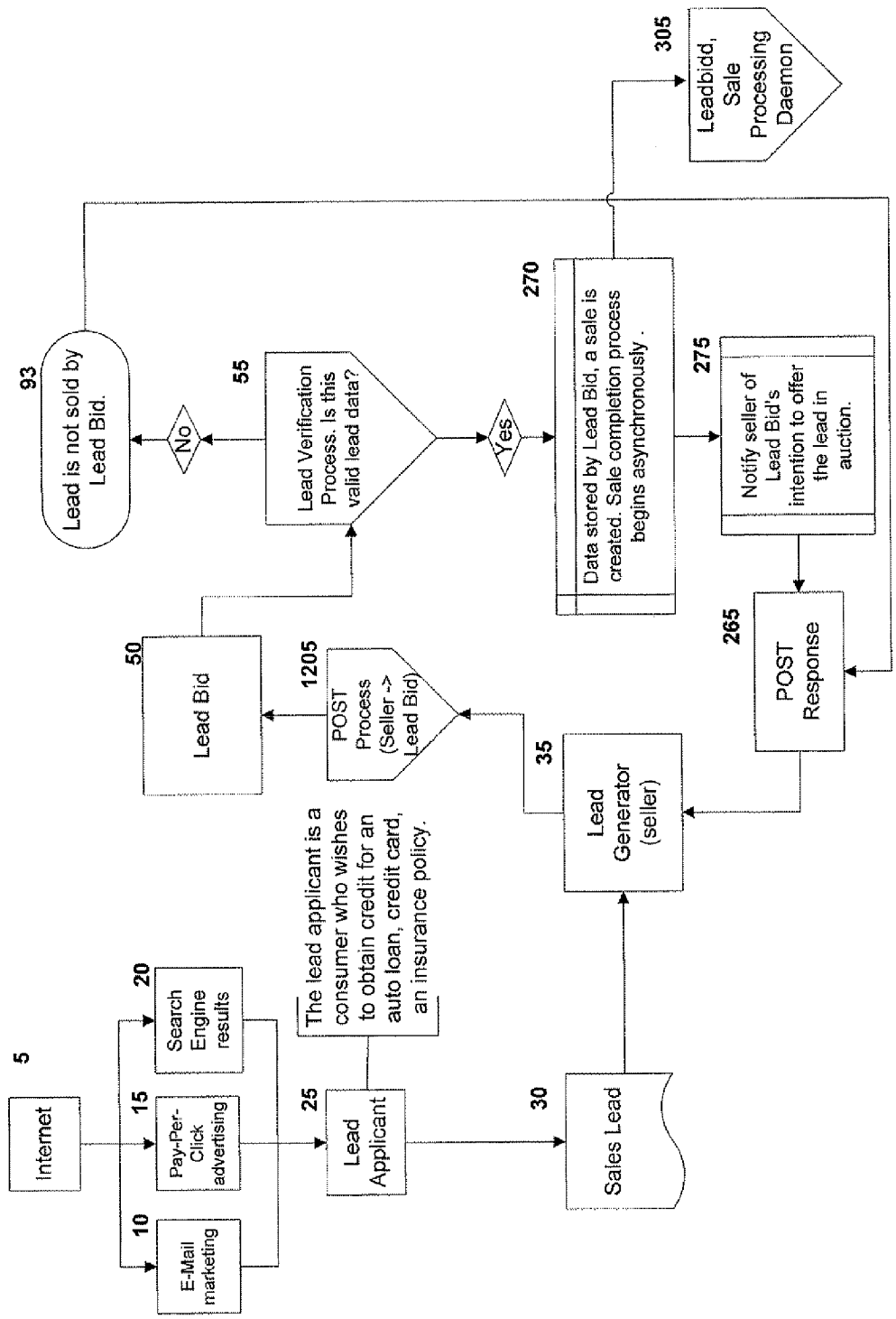
FIG. 2 is a flow diagram for a wholesale auction platform according to one embodiment of the present invention.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1A provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

FIG. 1B

Figure 1B:
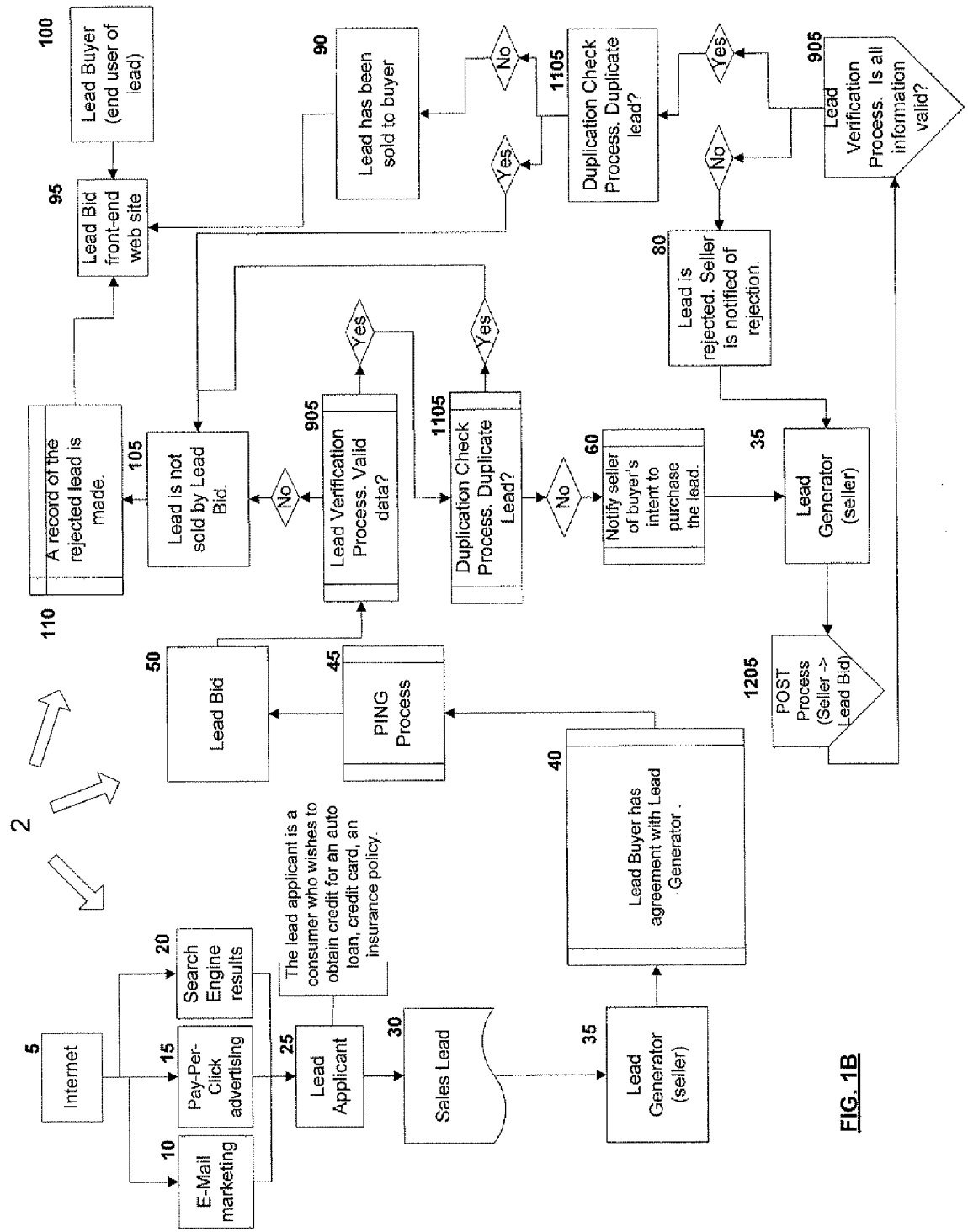
FIG. 1B is a flow diagram for a dealer account system according to one embodiment of the present invention.

Now referring to FIG. 1B, the Lite Dealer Account module process is shown according to one embodiment of the present invention. A Lead Generator 35 will use various methods including email 10, pay-per-click advertising 15, or search engine results 20 to entice a Lead Applicant 25 to fill in an application requesting their information, and thus indicating their interest in purchasing a product.

Regarding e-mail marketing 10 the consumer has indicated at some point in the past that they are interested in receiving special offers for products that they may be interested in. The Lead Generator utilizes a list containing the e-mail address of such consumers, as well as generally their name, and sometimes additional information about them. The generator sends an e-mail to each of the consumers on this list, hoping to garner their interest in whatever product they are interested in selling them. When the consumer responds to this e-mail, they are often presented with an application of some sort. The consumer provides their detailed information to the lead generator, and this information becomes a Lead 30.

Regarding pay-per-click advertising 15 the Lead Generator has agreements with various search engines and websites to display advertisements on their websites. These advertisements, which are usually contextual (e.g. an advertisement for an auto loan application may appear on a web page containing information about the automotive industry), attempt to entice a lead applicant 25 to click on the advertisement. When the consumer clicks the advertisement, they are often presented with an application of some sort. The consumer provides their detailed information to the lead generator, and this information becomes a Lead 30.

Regarding search engine results 20 the Lead Generator lists their web site, which usually contains an application of some sort, with the major search engines (such as Google, Yahoo!, Ask, or MSN). When a consumer utilizes one of these services to find a place to purchase a particular product, if the Lead Gienerator's website is among the results, the consumer will visit the website. The consumer provides their detailed information to the lead generator, and this information becomes a Lead 30.

Once the Lead Generator 35 has generated the lead, it determines who it would like to sell the lead to. If the generator has a contractual agreement with a buyer who has signed up to use the Lead Bid Lite Dealer Account platform 40, then they begin the process of selling to the lead buyer 99.

The process of selling the lead to a buyer subscribed to the Lite Dealer Account involves various steps. The seller performs the PING process 45, described in further detail in connection with FIG. 6 below. If the PING process indicates a negative result, the seller is unable to sell the lead to the buyer using the Lead Bid Platform 2. If the PING process indicates a positive result, the seller continues to the next step in the process. The seller is notified of the positive response to the PING message, and thus the buyer's intent to purchase the lead 60. The seller submits the lead, in its entirety, using the POST Process (Seller->Lead Bid), 1205 described in further detail in connection with FIG. 12. The full lead information is then submitted to the Lead Verification Process 905. If the Lead Verification Process indicates a positive result, the process moves on to the Duplication Check Process 85. If the Lead Verification Process indicates a negative result, the lead seller is notified that its lead data contains invalid data. The full lead information moves towards the Duplication Check Process 1105, described in further detail in connection with FIG. 11. If the Duplication Check Process indicates a positive result, the process moves on to the sale finalization process 90. If the Duplication Check Process indicates a negative result, the lead seller is notified that the lead cannot be sold to this seller using the Lead Bid Platform 2. A specific reason is not given to the seller, other than that the lead has been determined to be a duplicate. A record of the rejected lead is made 97, containing information useful to Lead Bid internally, The would-be lead buyer is notified via the Lead Bid Web Site discussed in connection with FIGS. 13-19 below.

In the sale finalization process 90, the lead has been sold by the lead seller to the lead buyer. A record of the transaction is made (the record is in part used for the Market Data). The Lead Buyer 99 can access the Lead Bid Web site 95 to retrieve their lead. The Lead Seller is then notified, in the response to the HTTP request, a confirmation number (Lead ID). The seller is notified that the transaction is completed, however the details pertaining to the agreement that the seller has with the buyer (pricing information, etc) may not be disclosed for privacy reasons.

The first step in the sale process is called the PING Process 45. The process is used by the lead seller to determine the buyer's (and thus, the Lead Bid Platform 2, acting on behalf of the buyer's interests) interest in buying the lead. A minimal subset of information about the lead is submitted to the Lead Bid Platform 2. This small amount of information helps the Lead Bid Platform 2 determine, in part, whether or not the lead is acceptable to the system (not a lead which the seller has received before). This process includes various steps including the seller compiling the minimal subset of information as demanded by the Integration Specifications. The seller may prepare the subset to be presented to the Lead Bid Platform 2, again, in accordance with the integration specifications. The format of the data can be either XML, or URL Encoded.

The seller may establish a connection to the Lead Bid web server, in accordance with a user's HTTP specification. The connection is made securely via SSL/TLS (Secure Sockets Layer. The seller may inform the Lead Bid web server that it would like to use the HTTP POST mechanism to post data to the document specified by the Integration Specifications. The seller may use the HTTP POST mechanism to submit the PING data to the Lead Bid web server. The Lead Bid Platform 2 may receive the request from the seller, and utilizes either an XML parser or URL encoded data parser to turn the information into computer-readable data. Lead Bid determines whether the data is URL encoded or XML data by analyzing the "Content-Type" incoming HTTP header.

The Lead Bid Platform 2 may determine if the data contained in the PING request is valid according to the Lead Verification Process 905, described in further detail in connection with FIG. 9.

If and only if the information in the PING request is valid, the Lead Bid Platform 2 determines, via the Duplication Check Process 1105 and using the minimal subset of information contained in the PING request, whether or not the lead may be a duplicate. Using the verification and duplicate checking process, a positive or negative response is generated. Both the seller and the buyer are notified of this failure. A detailed record of the failure is inserted into the database for internal use by the Lead Bid Platform 2.

The seller is notified of the failure in the response to the HTTP request and typically the response is in XML format. In the case that the PING data was invalid, as determined by the Lead Verification process, the seller is notified of the exact problem that occurred with the data. In the case that the PING data represented a lead which would be considered a duplicate, the seller is notified only that the lead is a duplicate. The seller is not notified of the exact reason or methodology that Lead Bid used to determine that the data represents a lead already bought by the buyer.

The buyer is notified of the failure only in the case that the PING data represented a lead which would be considered a duplicate. The data is available on the Lead Bid Web Site in the form of a count of the total leads rejected by the platform for duplication. This helps the buyer see the usefulness of the platform. If the PING process produces a positive result, the seller is notified in the HTTP response of the buyer's intent to purchase the lead 60.

FIG. 2

Referring now to FIG. 2 the Wholesale Auction Platform is described. As with the Lite Dealer Account Module of FIG. 1B, a Lead Generator 35 will similarly use methods including email 10, pay-per-click advertising 15, or search engine results 20 to entice a Lead Applicant 25 to fill in an application requesting their information, and thus indicating their interest in purchasing a product. Once the Lead Generator 35 has generated the lead, it begins the process of selling the lead through the platform. The process of selling the lead via the Lead Bid Platform 2 involves various steps. The Lead Generator 35 utilizes the POST Process (Seller->Lead Bid), described in further detail in connection with FIG. 10, to transmit lead data to Lead Bid Platform 250. The lead data includes a minimum price which the seller considers acceptable for the lead. The Lead Verification Process 905 is implemented so the Lead Bid Platform 2 may ensure that all data in the lead is valid. If the Lead Verification Process returns a negative result, the lead will not be sold by the Lead Bid Platform 2 (step 93). The seller is notified of the failure in the POST response 265 with a detailed error message. If the Lead Verification Process returns a positive result, the Lead Bid Platform 2 moves on to the next step which is the Duplication Check Process 1105. One the Duplication Check Process is initiated a it may return a negative result, and if so the lead will not be sold by the Lead Bid Platform 2. The seller is notified of the failure in the POST response 265, but not given the specific methodology used by the Lead Bid Platform 2 to determine duplicity.

If the Duplication Check Process 1105 returns a positive result, the Lead Bid Platform 2 process moves forward. Lead Bid notifies the seller of its intent to offer the lead to buyers in auction 275 via the POST Response mechanism 265. The Lead Bid Platform 2 then sends a POST Response to the seller where typically the response is in XML format, and includes a unique Lead ID Number.

The Lead Bid web server creates a record of a sale which is pending, and sends an electronic notice regarding the sale. The remainder of the process is handled asynchronously by a leadbidd sale processing daemon as described in further detail in connection with FIG. 3.

FIG. 3

Figure 3:
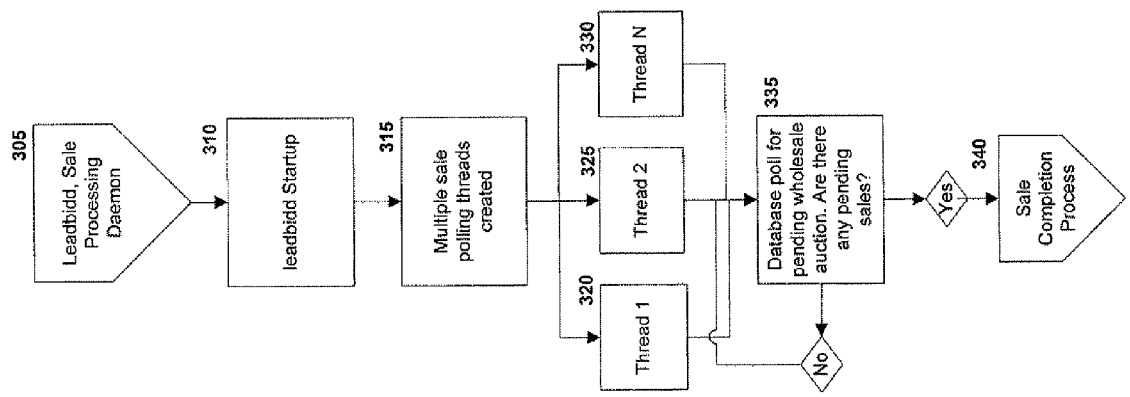
FIG. 3 is a flow diagram for a sale processing system according to one embodiment of the present invention.

Referring now to FIG. 3 the leadbidd sales processing daemon is discussed. The leadbidd sales processing daemon 305 is a separate application which runs in the background at all times and processes sales and live auctions. Due to the volume handled by the Lead Bid Platform 2, and the non-persistent nature of HTTP connections, it is necessary to have a background application to do the processing of sales. Upon startup 310, the leadbidd sales processing daemon 305 creates multiple "polling threads" 315. The number of threads of execution created depends on a compile-time configuration option. A greater amount of polling threads enables the leadbidd application to process a larger amount of sales simultaneously. Each thread polls the database at specified regular intervals 335 to determine if there are any pending sales to be processed. If there are not, the thread switches into an idle state for the specified interval, and resumes by again polling the database. If there are pending sales waiting to be processed, the thread moves independently to the Sale Completion Process 340, described in further detail in connection with FIG. 4.

FIG. 4

Figure 4:
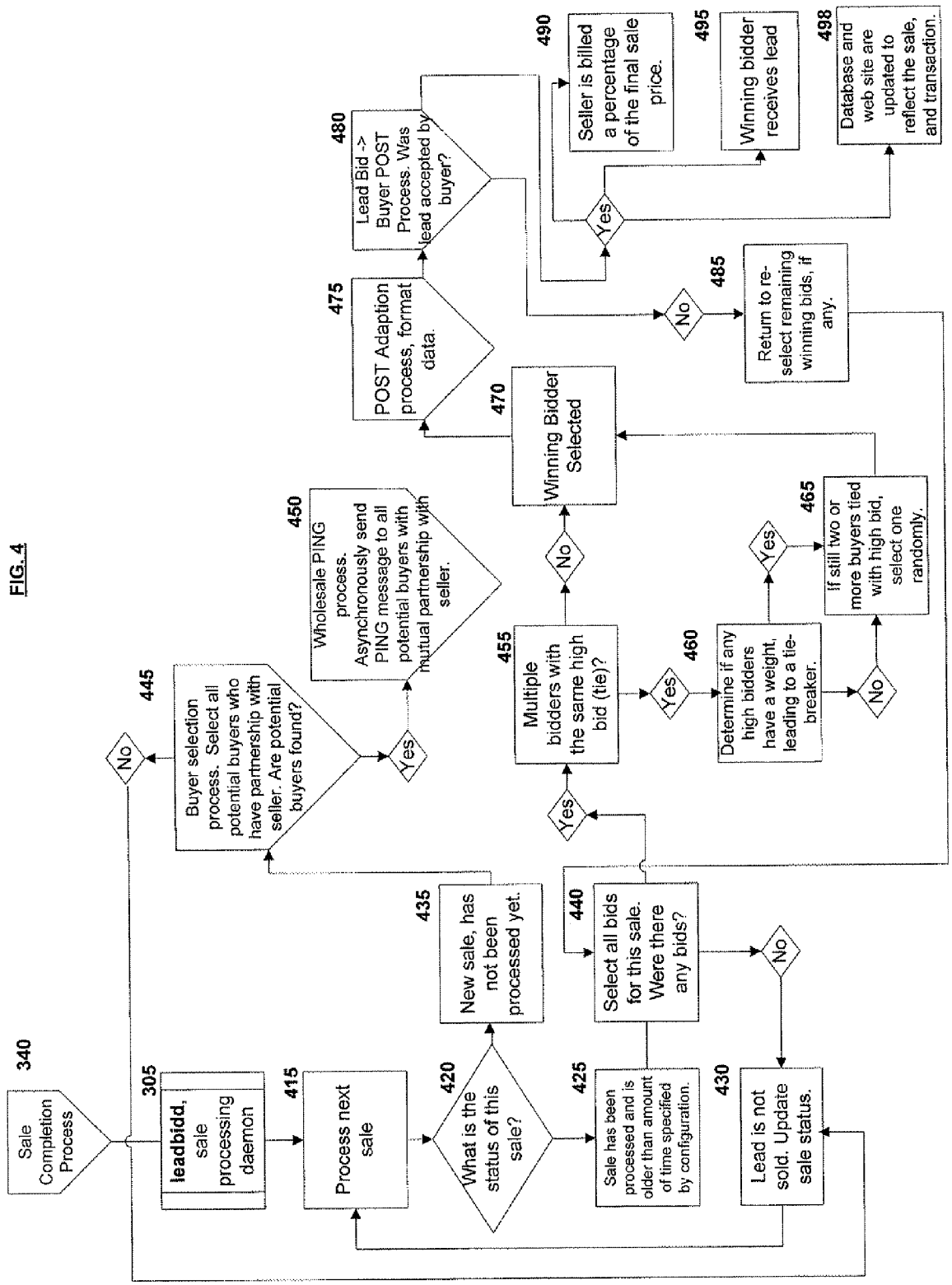
FIG. 4 is a flow diagram for a sale completion system according to one embodiment of the present invention.

FIG. 4 shows the Sale Completion Process according to the present invention. The Sale Completion Process 340 is the process where pending sales created by the Lead Bid web server at the request of a seller are completed. Completion of a sale involves gathering data about the sale, notifying potential buyers of the opportunity to purchase the lead offered in the sale, determining the winner of the auction, if any, and finally making a record of the transaction that has taken place.

The Sale Completion Process 340 begins when the leadbidd sales processing daemon 305 initiates the process. Information about the sale 415 is gathered, including who the seller is, the geographical location of the consumer, the minimum price for the lead, the status of the sale (either 'pending' or 'active'), and the time of the last status update. Upon obtaining all of the pertinent information about the sale, the sale is examined to determine its status 420. If the sale's status is 'pending', then it is a new sale which has not been processed yet 435.

If the sale's status is 'active', and the sale's status was changed from 'pending' more than X seconds ago (where X is the sale length time, specified by the configuration of the program, usually 120 seconds), the Lead Bid Platform 2 flows to the process Active Sale Processing 440. A sale that is 'pending' is a sale which has, Y moments ago, been created as the result of a seller submitting a valid lead for sale in the Seller->Lead Bid POST Process. The Buyer Selection Process is then initiated 445 which is described in further detail in connection with FIG. 7.

If potential buyers are not found, the Lead Bid platform is unable to sell the lead 430 because of a lack of eligible buyers or a lack of buyers who have expressed interest in purchasing the lead. Sellers are notified of this via the Lead Bid web site. If potential buyers are found through the buyer selection process, the Lead Bid platform moves to the wholesale PING process 450.

In the wholesale PING process, a PING message IS asynchronously sent to all potential buyers returned by the buyer selection process. This process is described in more detail in connection with FIG. 6. Each buyer is sent a minimal subset of information in the lead data.

Active Sale Processing

A sale that is an 'active' sale which has been active for greater than the amount of time specified by the configuration is processed using this method 425. The sale remains active long enough for all potential buyers to be notified of the opportunity to purchase the lead offered in the sale, and given enough time to respond to the opportunity by placing a bid if they so desire.

All bids that were placed by potential buyers of this lead 440 are gathered and reviewed. If there were no bids from potential buyers of this lead, the lead cannot be sold 430. In this case, a record of the inability to sell the lead is made, and the seller is notified by way of the Lead Bid web site.

A determination is made regarding which buyer placed the highest bid for the lead. In the event that two or more buyers have entered the same high bid 455, a selection of one of the buyers as the winner is made. A buyer may be attributed a "weight" and a determination may be made that a certain buyer meets arbitrary criteria for receiving a more favorable result in a tie-breaker 460. If a buyer has a "weight", then their "weighted bid" is the product of their actual bid, and their weight factor. For example, if the buyer's weight factor is 2.0, and the buyer has placed a bid for $4, they may be declared them the winner of the auction if no other bidders have placed a bid or weighted bid that is greater than $8.

If, after bid weighting, two or more buyers still have the same high bid, one of the high bidders is selected randomly 465. At this point, the winner of the auction is selected 470 and this user will go on to receive the lead. Since many buyers use entirely different systems for processing incoming lead data, the POST Adaptation process 475 is implemented as described further detail in connection with FIG. 5. The lead data is adapted to the format required by the buyer's integration specifications before being sent to the buyer.

The Lead Bid->Buyer POST process 480 is initiated as described in further detail in connection with FIG. 10 and the lead buyer is sent the lead data which originated from the lead seller. The buyer can refuse or reject the lead, based on their own internal criteria. Originally the buyer had just the minimal subset of information contained in the PING, enough to indicate possible interest in purchasing the lead. Now that they have all of the information, they may choose to reject it based on their own internal criteria.

If the Lead Bid->Buyer POST process returns a positive result from the buyer, then the lead was accepted and the Lead Bid Platform 2 may move to the next step. If the process returns a negative result (they rejected the lead), the Lead Bid Platform 2 may return to the bid selection process 485 to determine the winning bidder again, this time excluding this buyer that has rejected the lead. If there are no remaining bids, the lead cannot be sold 430.

At this stage, the lead has been sold and a record is created recording the sale. The buyer of the lead has received the lead already 495 during the Lead Bid->Buyer POST process 480. The database and web site are updated to reflect the sale and the transaction 498. The lead becomes searchable by both the buyer and seller, and each party can view the lead on the Lead Bid web site. The seller is billed a percentage of the final sale price 490. A transaction record is created noting the lead ID number, the time the transaction took place, and the amount the seller was billed for the transaction.

FIG. 5

Figure 5:
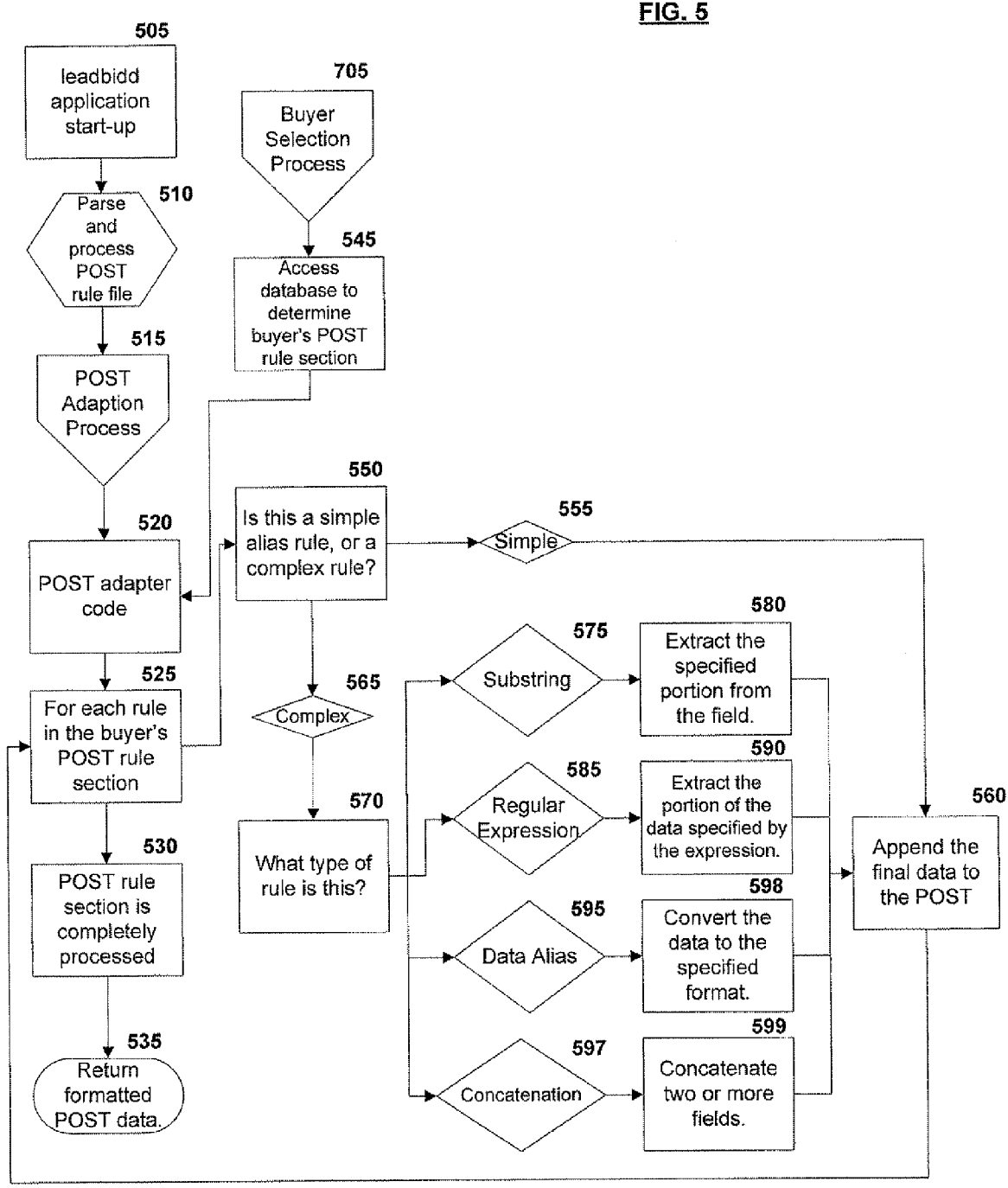
FIG. 5 is a flow diagram for a post adaptation system according to one embodiment of the present invention.

FIG. 5 shows the POST Adaptation Process according to the present invention. In the lead industry many different buyers use their own technology, developed in-house, for lead management. As a consequence, all outgoing data must be "adapted" to suit the needs of its clients. For example, the buyer may require the information in URL encoded format, or XML format. They may separate the phone number field into three different fields (area code, prefix, and number), or they may require the date of birth to be in MM-DD-YYYY format instead of the YYYY-MM-DD format. To that end, the POST Adaptation Process is implemented developed.

The POST Adaptation process begins with all of the data contained in a lead, end ends with data formatted in the way mandated by the buyer's integration specifications. In-between these two stages lay the POST Adaptation code, which adapts the lead data to the buyer's format using a series of rules.

Upon stat-up of the leadbidd application 505 the application parses and processes the POST rule file 510. The POST rule file is a plain-text file containing all of the rules necessary to communicate with all of the user's clients. Standard operating system methods are used for reading from the file, and internal code to understand the meaning of each line in the file. The rules are stored for later use.

Each rule is a single field name which will be outputted in the buyer's requested format (XML, URL Encoded, etc). For each field that the buyer requires, there may be one of many different types of rules applied to that data. In the POST Adapter Code 420, the POST Adapter is sent a request from the Sale Completion Process to adapt lead data to a specific buyer's format. The application 505 gathers information previously retrieved in step 510 related to the individual buyer. During the buyer selection process 705 which happens separately and will have retrieved the section of the POST rule file which applies to the individual buyer 545. The final output data is formed based on the rules supplied in the POST rule file. For each rule in the buyer's POST rule section 525 the application determines if there is a simple alias or constant rule 550.

In the case that it is a simple alias or constant rule 555 either the constant string in the rule, or the data corresponding with the field name is appended. For example, if the buyer requires the "res_zip" field (the zip code field, as the Lead Bid Platform 2 stores it internally) to be called "zip_code", the lead applicant's zip code is appended to the final output as a field named "zip_code".

If there is a more complex rule 565 it may be one of four different types. The type of rule is determined 570 before actually determining what data should be outputted. In the case that this is a "substring" rule 575, the rule states that a portion of the data as it is defined is outputted. An example would be if the buyer requires the home telephone number of the lead applicant to be in three separate fields. The first through third digit for the first field may be extracted as well as the fourth through sixth digit for the second field, and so on 580.

In the case that this is a "regular expression" rule 585 the buyer requires the information in this field in such a way that makes simple substrings, data aliases, or concatenation impossible to produce a satisfactory result. The application 505 uses a "regular expression" to process the data stored by the user, capturing one or more back references which will represent the final output 590.

In the case that this is a "data alias" 595, the buyer requires information to be presented in such a way that a regular expression, substring, or concatenation cannot be used. The data is usually of constant value, for example, a seller might require "yes" or "no" to be used instead of a "1" or "0". The data is replaced and appended to the final output 598. In the case that this is a "concatenation" 597, two or more fields from the user data must be combined to make one full output field. The fields are combined and appended to the final output 599.

Once the rule has been understood and the final data for this rule determined, the field is appended to the final POST output 560 and returned to process any remaining rules, if any 525. Once all of the rules have been processed 530, the final formatted POST data is returned to the caller 535 and the lead data has been adapted to the buyer's specific format.

FIG. 6

Figure 6:
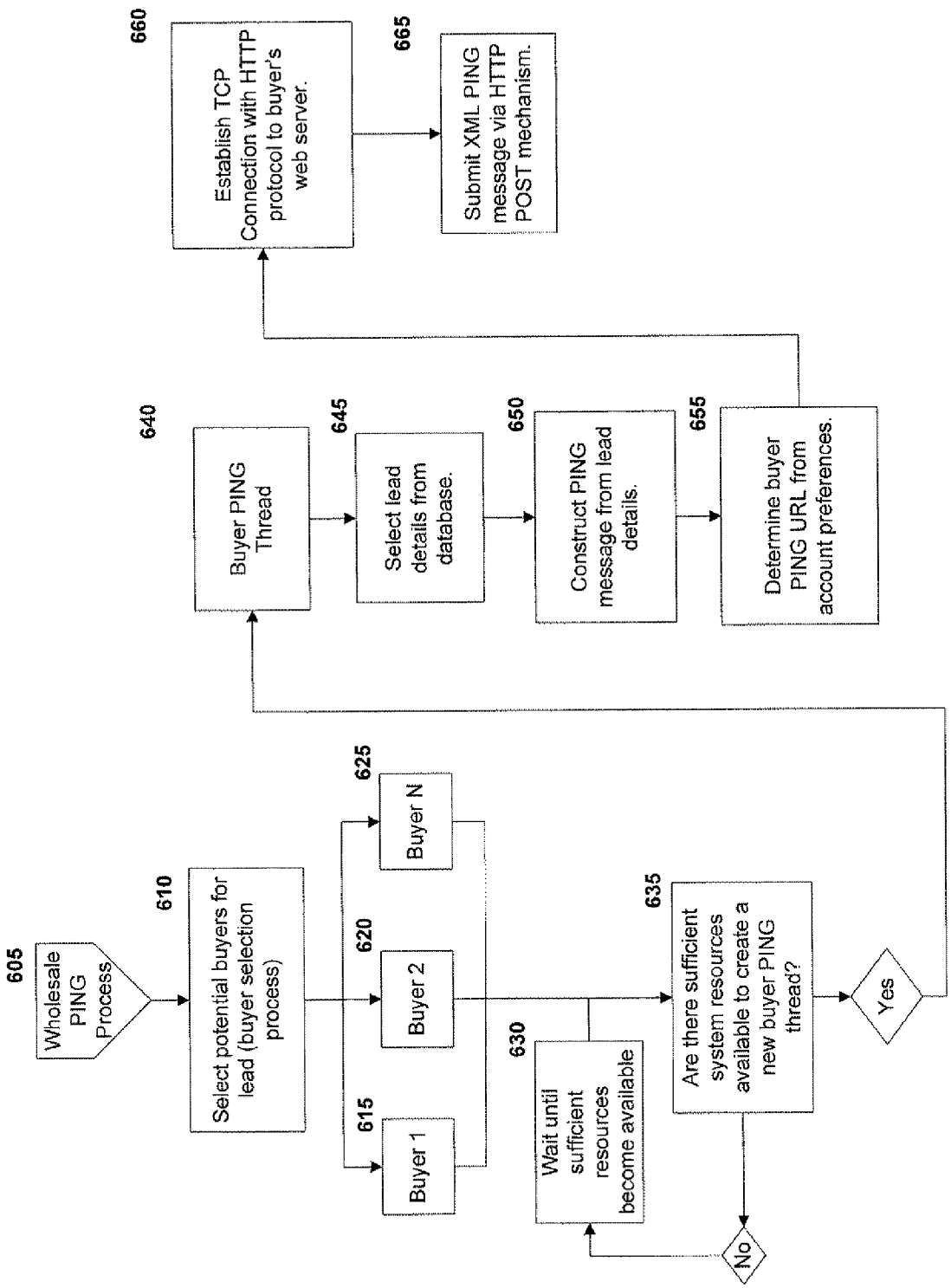
FIG. 6 is a flow diagram for a wholesale ping system according to one embodiment of the present invention.

FIG. 6 shows the Wholesale PING Process according to the present invention. The Wholesale PING Process 605 is used to send PING messages to all prospective buyers, as determined by the Buyer Selection Process 610. A PING is a way of letting a potential lead buyer know that a lead is available for sale, and if they would like to buy the lead, they should place a bid for it. Due to the large amount of buyers who could potentially be interested in buying a lead, and the relatively short time span over which a sale occurs, sufficient system resources coupled with multi-threaded architecture are required to complete this process.

The Wholesale PING Process includes multiple steps. The system creates the minimum amount of PING threads allowed. The minimum amount is defined by the program's configuration. Each thread that is created 615, 620, and 625 is responsible for sending a PING message to an individual buyer. The sending of PINGs happens in a loop. For each buyer a PING is sent under various conditions. For example if there is a PING thread which is idle and not currently communicating with a potential buyer 635. If there is an idle PING thread 640, the process moves to the next step. If all currently created PING threads are busy communicating with other buyers, a determination is made regarding whether there are sufficient system resources to create another thread.

If there are sufficient system resources another buyer PING thread 635 is created. This new thread is then communicated to the buyer. If there are not sufficient system resources, the Wholesale PING Process re-iterates in the loop until sufficient resources become available, or a ping thread becomes idle (finished it's work). Each newly created PING thread is instructed to send out a PING 645.

Inside the actual PING process, having been given the lead ID by the Wholesale PING Process, the pertinent information about the lead is reviewed. The potential buyer is then given a small subset of information about the lead, including (but not limited to) the public lead ID, the lead applicant's zip code, and their gross monthly income if applicable by the lead type.

A PING message 650 is then constructed from the lead details obtained in 645. The PING message is formatted according to the buyer's specifications. Having selected the potential buyer's account details during the Buyer Selection Process their PING URL is determined from their preferences. Each buyer sets a PING URL which points to their own web application which will process the PING request. A connection is then established to the buyer's web server specified by their PING URL over the HTTP protocol 660. The PING data is then submitted using the HTTP POST mechanism 665. The buyer is instructed by the Wholesale PING Process to handle the PING request asynchronously, where the user does not wait for an HTTP response from the buyer. The connection is closed after five seconds if no response is given.

FIG. 7

Figure 7:
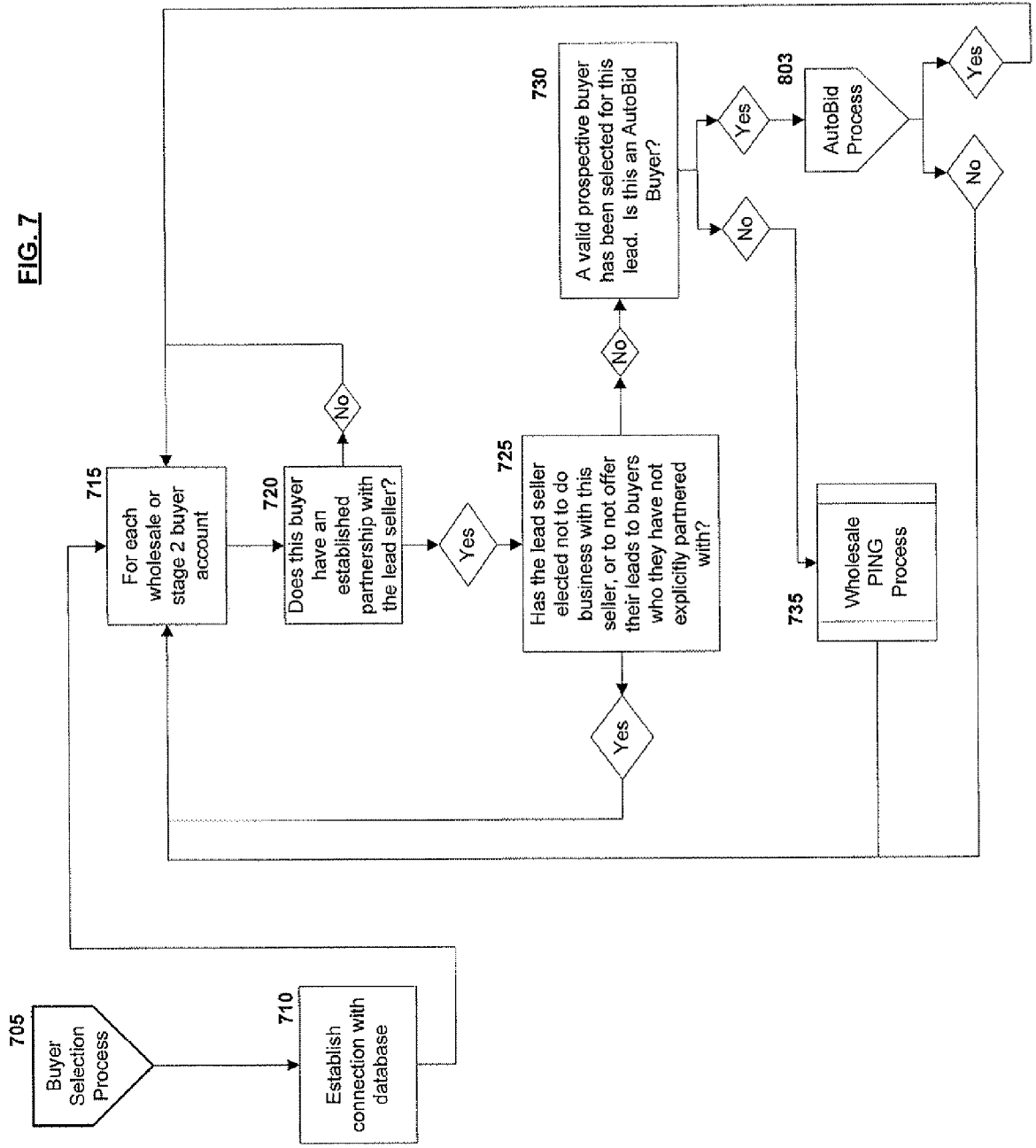
FIG. 7 is a flow diagram for a buyer selection system according to one embodiment of the present invention.

FIG. 7 shows the Buyer Selection Process according to the present invention. During the sale completion process all of the potential buyers from the user's list of buyer accounts are selected for buyers eligible to receive information about a lead, and are presented with the opportunity to buy it. Wholesale buyers will decide on their own, using their own business logic, whether or not they would like to buy the lead through the PING and bid process. Lead buyers subscribed to the AutoBid system will have bids automatically placed on their behalf by the user based on criteria that they define. The process of selecting eligible buyers is the Buyer Selection Process. The buyer selection process also determines which potential buyers have reciprocal partnerships with the seller offering the lead.

The present invention will not offer a buyer an opportunity to purchase a lead under all conditions. There are certain conditions that must be met including that the buyer indicated that they would like to do business with the seller or that the seller has indicated that either they would like to do business with the seller, or that they would like to do business with any buyer who they have not explicitly stated that they would not like to do business with. In certain conditions the system will not allow an offer such as when the seller has not explicitly indicated that they would not like to do business with the buyer.

The Buyer Selection Process 705 for a lead is an iterative process. A connection with the database is established 710. A list is selected including all accounts in the system which is wholesale buyer accounts, or auto-bid buyer accounts. The iterative process then begins. By performing the steps for each account selected 715. A determination is made regarding whether this buyer has established an explicit partnership with the seller 720. If the buyer has not they have not indicated that they have interest in purchasing any leads from this seller and the system moves back to process the next buyer selected.

Then a determination is made whether the seller has explicitly elected not to do business with this buyer, if the seller has explicitly stated that they would like to do business with this buyer, or if the seller has expressed interest in selling their leads to all buyers regardless of their explicit statement that they would like to 725. If these conditions are not met, the system moves back to purchase the next buyer selected. This buyer is not eligible to purchase this lead.

Once a valid prospective buyer for this lead has been selected 730, the system determines that this is an account where both buyer and seller have stated that they would like to do business with each other. There is a determination made regarding whether this buyer is a normal wholesale buyer, the location to send a PING message to, or if performance of the AutoBid process is appropriate.

If this buyer is a normal wholesale buyer account, the information is returned to the caller, which will perform the Wholesale PING process for this buyer 735. If this buyer is an account which has been subscribed to the AutoBid process, that process is performed 803. If there are more buyers to process, the system returns to 715 to process them.

FIG. 8

Figure 8:
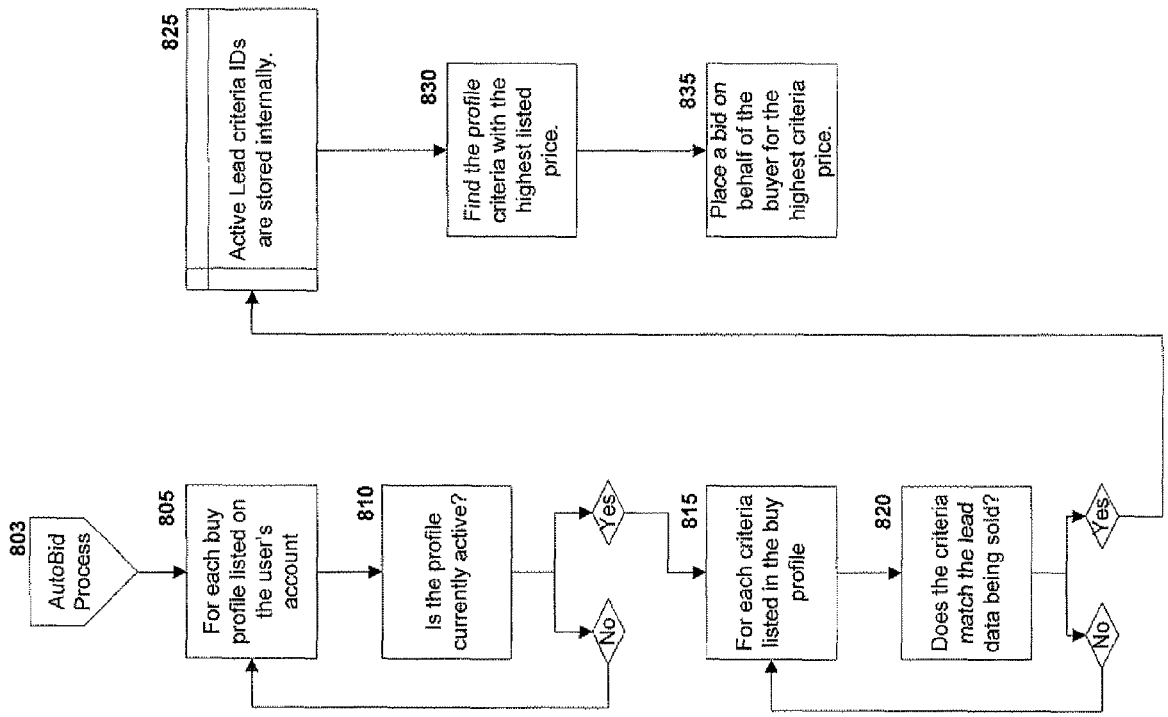
FIG. 8 is a flow diagram for an automatic bid process according to one embodiment of the present invention.

FIG. 8 shows the AutoBid Process according to the present invention. Some lead buying clients may wish to buy leads on the wholesale platform, but at the same time do not have the technology or the ability to create the technology to bid for the leads in real time. Appropriate technology can be provided to them. To this end, the AutoBid process was developed. The AutoBid process allows lead buyers to opt out of the wholesale ping process, and instead specify specific parameters describing leads that they would like to buy, and how much they would like to pay for them. The specific parameters include any or all of the following:

The seller of the lead. A buyer may elect to bid more for a lead offered by a specific seller;

The generation method of the lead. Generation methods include "e-mail", "pay per click", "web", and "prize";

Whether or not the lead applicant has previously filed for bankruptcy;

Whether or not the lead applicant has a co-signer available (if applicable);

Whether or not the lead applicant has authorized the lead buyer to perform a credit check, forward the application to another party, or present them with special offers unrelated to what they originally applied for;

The minimum and maximum monthly income of the lead applicant;

The minimum and maximum residence cost of the lead applicant, if applicable to this lead type;

The minimum time that the lead applicant has been employed by their employer;

The minimum amount of time the lead applicant has lived at their current residence; or A radius (in miles) around a geographical location (zip code).

The buyer specifies different criteria in what known as "profiles". The buyer may have an unlimited number of criteria assigned to an unlimited number of profiles. A profile specifies the time and day of the week which it activates, and deactivates. This system is in place so that buyers may opt to bid higher (and thus have a better chance of winning) leads at the time of the week when they are more valuable to them. For example, an automotive dealership buying car loan leads may have higher foot traffic or more available salespeople on the weekend, and thus may want to purchase more leads for this time.

Based on the criteria specified by the buyer, the Lead Bid Platform 2 may automatically place a bid on a lead that is for sale on the buyer's behalf. If the lead is purchased by the buyer, the Lead Bid platform 2 handles all transaction details and accepts the lead on their behalf. The lead is then viewable on the Lead Bid web site. The AutoBid process 803 includes various steps. There is an iteration through the profiles in the buyer's account 805. For each profile listed in the buyer's account, there is a determination regarding whether or not the profile is currently active. For example, if the profile is set to be active between "Friday at 8 am and Sunday at 9 pm", and the current date and time represents that time period, then the profile is currently active. If the profile under examination is not currently active, the system moves back to examine any remaining profiles on the account.

If the profile is active, the Lead Bid Platform 2 may select all of the criteria which is listed with this time profile 815. Each criteria listed could contain specific requests to purchase a lead based on the above criteria possibilities. Each criteria also contains a price which they are willing to pay for a lead matching that criteria.

There is a determination regarding whether the criteria selected matches the lead data in the lead being sold 820. If it the criteria does not match this lead, then the criteria does not apply to the lead and the Lead Bid platform continues to iterate through the remaining criteria attached to this profile. If the criteria matches, the criteria is stored internally in a linked list of criteria which is currently active and valid for the lead being sold 825. Upon finding criteria which matches the lead, and is currently active, the linked list of criteria is sorted in order to find the criteria with the highest bid amount 830. A bid is then placed on behalf of this buyer for the lead that is being offered 835.

FIG. 9

Figure 9:
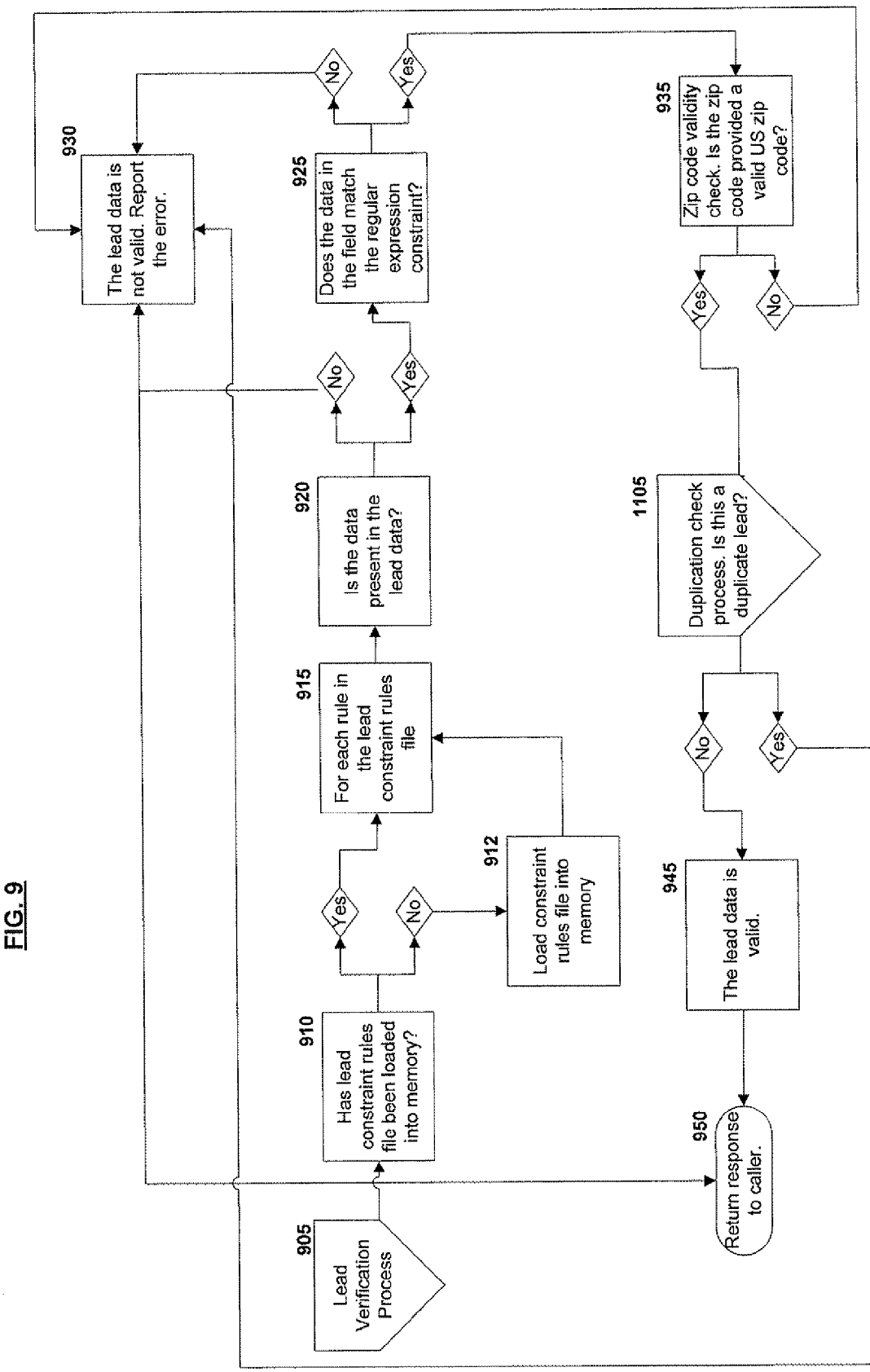
FIG. 9 is a flow diagram for a lead verification process according to one embodiment of the present invention.

FIG. 9 shows the Lead Verification Process according to the present invention. The system takes steps to ensure that all lead data contains valid information when submitted by sellers for sale on the platform either through the wholesale auction platform, or directly to a buyer. This is accomplished by using the Lead Verification Process 905. In order to be able to easily update data constraints, all rules are stored into a lead constraint rules configuration file. Each rule specifies what each field of data must conform to. For example, a zip code must be exactly five digits, a middle initial must be exactly one alphanumeric character, the e-mail address must conform to RFC2822 (Internet Message Format) specifications, etc. Constraints are made using regular expressions. For each field that in the lead data, there is a rule stored in the lead constraints rule file. When the lead verification process is initiated, a determination is made regarding whether the program has previously loaded the constraint rules file into memory 910. If not, the file into memory 912 is loaded. This involves reading the file line-by-line using a custom configuration file format. An this abbreviated version of the file format, showing regular expression rule constraints for first name, middle initial, and last name of the lead applicant, appears as follows:

```
group "lead_column_constraints" {
    key "first_name"      = "^([[:alpha:]]+(-| )?)+$";
    key "middle_initial"  = "^[[:alpha:]]{0,1}$";
    key "last_name"       = "^([[:alpha:]]+(-| +)?)+$";};
```

Full details about each lead data field and the requirements set forth by the lead constraints configuration file are provided to the seller by way of the integration specifications.

In order to verify that the data contained in the lead fields conforms to the user's constraints, an iterative process is implemented that examines each rule and compares it with the corresponding field 915. Thus, for each rule certain checks are made, including a check to ensure that the field corresponding to this rule is present in the lead data 920. If it is not, the system stops immediately, and reports the error to the caller 930. This is included in the response to the caller 950.

Each rule is a regular expression which represents the required format of the data, hence knowing that the data exists. The regular expression is compared with the data contained in the field 925, and if the regular expression matches the test subject the next step is processed. If it does not, the lead data in this field is invalid. A human readable error message about the error is appended to the error response, and the system moves on to process the next rule.

There is a validation step ensuring by way of a national zip code database that the zip code is a valid U.S. zip code 935. This is accomplished by searching the zip code in a local database. If the zip code is not present in the database, the zip code is not valid. A human readable error message about the error is appended to the error response.

A duplication check is then performed 1105. If the lead is deemed to be a duplicate, a human readable error message about the error is appended to the error response. In the event that any lead data is deemed to be invalid 930, a human readable error message and an error code, as described by the integration specifications, is appended to the error response message which will eventually be sent to the seller A determination is made regarding whether there were any errors with the lead data that was submitted 945. If there were no errors, a positive response is sent to the seller. The response includes a confirmation code, which is the public lead ID number. The exact response is detailed in the integration specifications. If there were errors, a negative response is sent to the seller. The response indicates a code for each error that occurred, as well as a human-readable error message. The response that was created to the caller 950 is returned and the caller forwards the response to the seller.

FIG. 10

Figure 10:
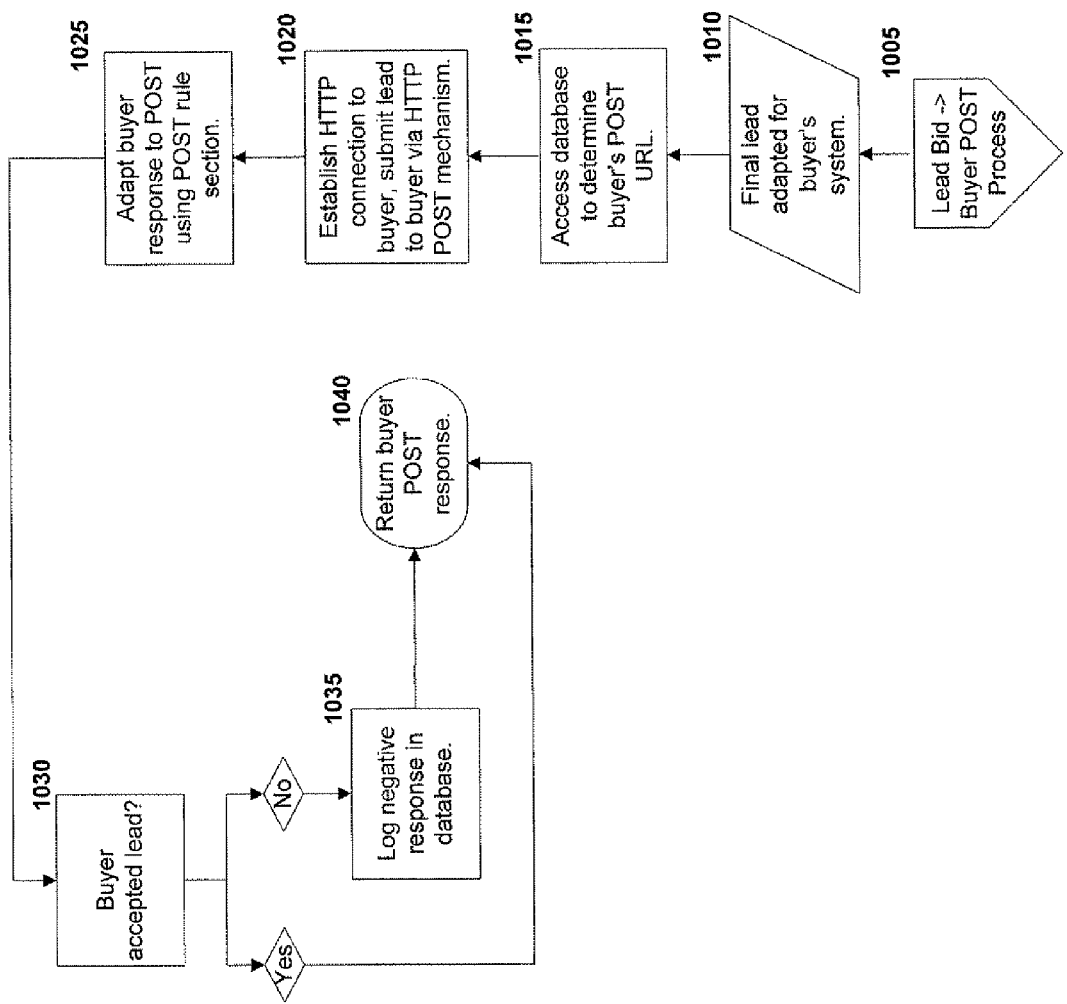
FIG. 10 is a flow diagram for a post processing system for buyer information according to one embodiment of the present invention.

FIG. 10 shows the POST Process (Lead Bid->Buyer) according to the present invention. The POST process (Lead Bid->Buyer) 1005 is the process by which a lead buyer receives, and has the option to refuse a lead where they have indicated they would like to purchase the lead and have been determined to be the highest bidder for the lead. The lead is submitted to the buyer via the HTTP POST mechanism to the URL specified by their account preferences. The process include multiple steps including adapting the final lead 1010 using the POST adaptation process.

The database is accessed to retrieve the buyer's account information and preferences. Stored among the preferences is the URL that will be submitted the lead to 1015. A connection to the buyer's web server is established using the HTTP protocol and then the lead data is transmitted using the HTTP POST mechanism 1020.

Using the same POST Adaptation Process, the buyer's response to the POST is converted to data which can be understood 1025. A Boolean value is derived stating whether or not the buyer has accepted the lead, the buyer's confirmation code (if any), and the error message (if any). A determination is made regarding whether the buyer has accepted the lead 1030 using the Boolean value in their response to our POST. If the buyer has not accepted the lead, a negative response is logged in the database 1035. The user may later their account to determine if excessive leads have been denied, and take appropriate measures. Since the buyer is given the full lead information so that they may make a decision on whether or not to buy the lead, the buyer could effectively be given the lead for free. Thereafter the buyer's response to the caller of this process 1040 is returned.

FIG. 11

Figure 11:
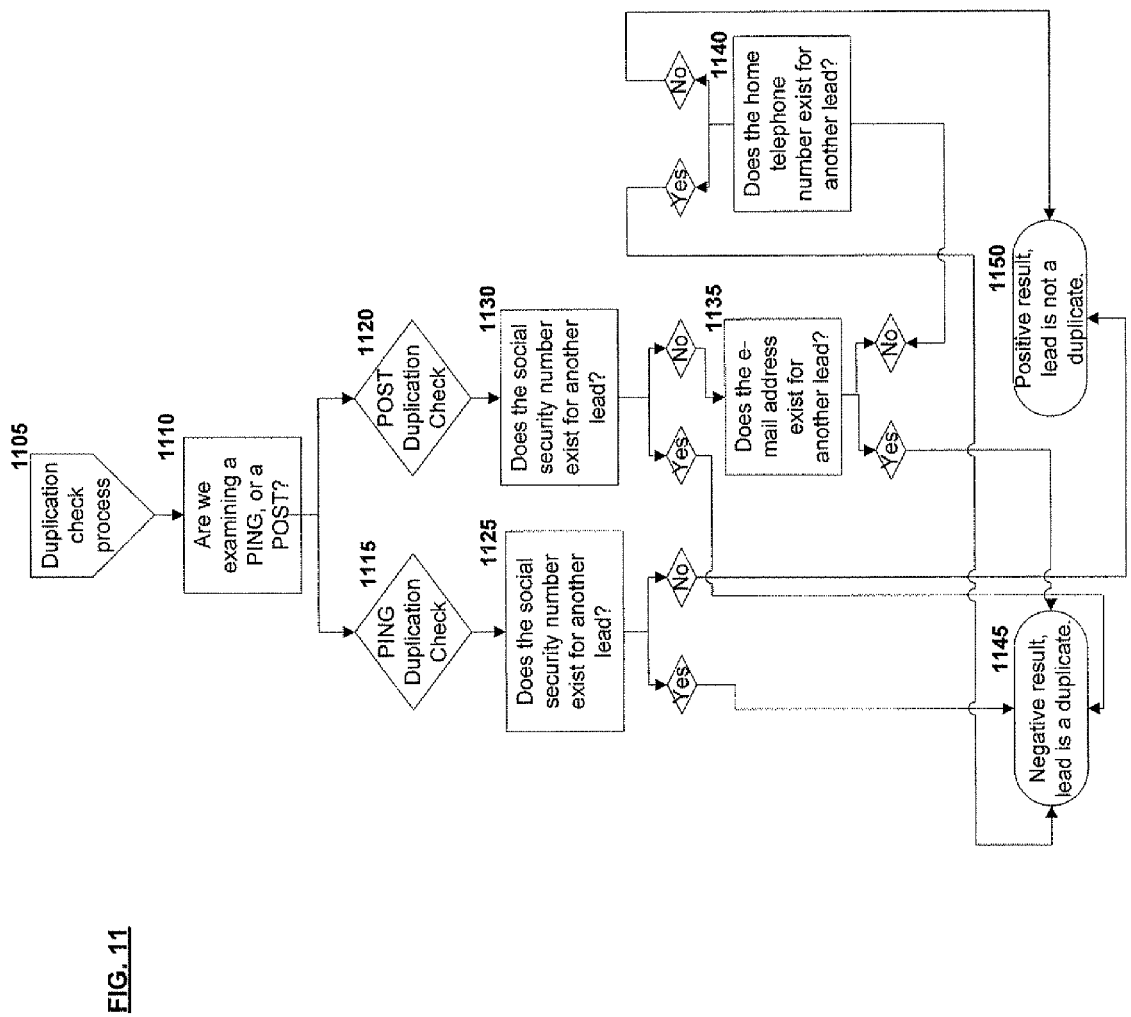
FIG. 11 is a flow diagram for a duplication check process to one embodiment of the present invention.

FIG. 11 shows the Duplication Check Process according to the present invention. In the Duplication Check Process 1105, a number of data fields are implemented to determine whether or not a lead is a duplicate. Duplicate leads prevention is an important feature and advantage of the present invention. The data regarding the lead applicant is used to determine whether or not a given lead has been submitted for sale in the system previously. A check for duplicates is run both in the PING Process, and the Seller->Lead Bid POST process. In the PING process, there is less information about the lead, so as many comparisons with existing data is not possible. The Duplication Check Process first determines if it is examining POST data or PING data 1110. Thus, the process is split into two pars, the PING duplication check 1115, and the POST duplication check 1120.

Three pieces of data are used use to compare leads for duplicity including the lead applicant's social security number, e-mail address, and home telephone number. This data is present for all leads and should be unique among lead applicants. Only the social security number field is available during the PING process. A lead which has been submitted 30 days prior to the lead being submitted does not count towards duplicity. The process requires multiple steps, with only the first step happening during the PING duplication check There is a search for existing leads in the system submitted within the last 30 days with the same social security number of the lead being submitted 1125. If any such lead exists, the process returns a negative result and this lead is considered a duplicate 1145.

Existing leads in the system are then submitted within the last 30 days where the lead applicant has provided the same e-mail address as the lead being submitted 1130. If any such lead exists, the Duplication Check Process returns a negative result. This lead is then also considered a duplicate 1145. Another search is conducted looking for existing leads in the system submitted within the last 30 days where the lead applicant has provided the same home telephone number as the lead being submitted 1140. If any such lead exists, the process returns a negative result and this lead is then considered a duplicate 1145. If the duplication check deems this to be a lead which has not been submitted within the last 30 days, a positive result is returned to the caller of the Duplication Check Process,

FIG. 12

Figure 12:
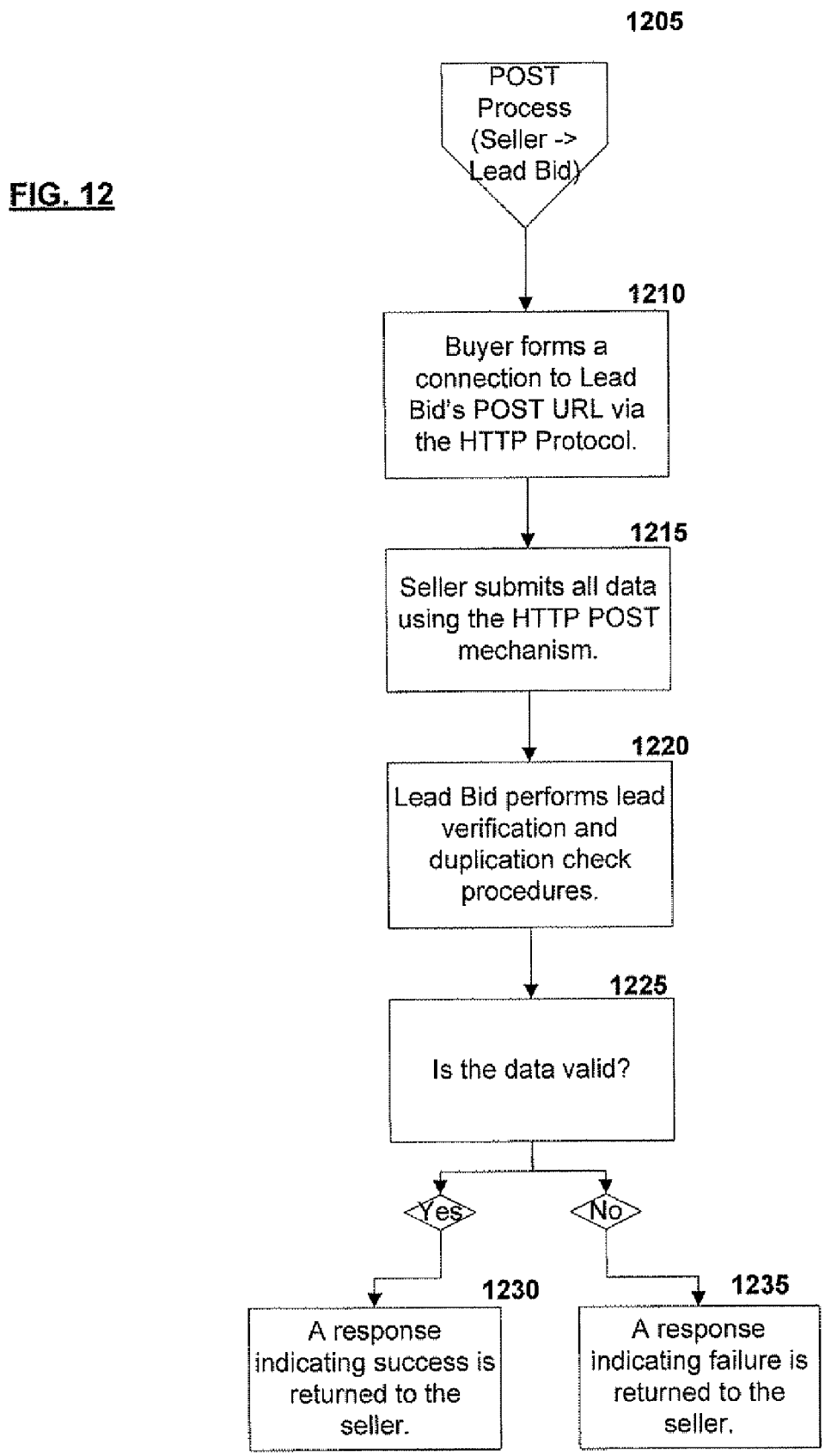
FIG. 12 is a flow diagram for a post processing system for seller information according to one embodiment of the present invention.

FIG. 12 shows the POST Process (Seller->Lead Bid) according to the present invention. The POST Process (Lead Bid->Seller) 1205 is the process where a seller submits a lead in its entirety with the intent of either selling it on the Wholesale Auction Platform, or directly to a Lite Dealer Account. The seller follows detailed instructions according to the user's specifications. They are given the user's POST URL and told that they may either submit lead data in URL Encoded format or XML format. The process of a seller POST include multiple steps including establishes a seller connection to the system according to the present invention using the HTTP protocol 1210. The seller then transmits all lead data, as well as their account login information. The data is in either XML or URL Encoded format and is verified by the present invention. Verification includes that the login information is correct, and it looks up the seller's account information and determines whether or not they are permitted to sell leads on the platform. The lead verification and duplication check procedures are then complete.

There is then a determination whether all of the information submitted is valid 1215. If the data is valid, a response is sent to the seller indicating success. The response in transmitted to the seller in XML format, and is detailed by the Integration Specifications. The response is transmitted as a reply to the HTTP request.

If the data is not valid, a response indicating failure is sent to the seller. The response is transmitted to the seller in XML format, and is detailed by the Integration Specifications. The response is transmitted as a reply to the HTTP request.

The Lead Bid Web Site

A Website portal to implement the present invention is formed by a single executable application which the web server executes upon every request. Requests include placing a bid, submitting a lead, or normal user interface requests. The single executable application is called "leadbid.cgi". Leadbid.cgi is a web application which facilitates all front-end interactions with human users of the platform. It is divided into modules, each having a specific purpose as follows:

A Login module is a secure module serves web content based around logging in and out of the web site. It facilitates the "Log In" and "Log Out" functions over a secure web connection;

An Administration module is a module serves web pages and performs duties relating to functions to be performed by Lead Bid Express administration (IT personnel, etc);

A Bid module accepts incoming bids from buyers during a live auction;

A Buy Profiles module is a module that serves web content related to the modification and addition of new "profiles" to a user's account;

A Buyer's module is a module that serves web content related to a buyers' account. It provides brief reporting such as how many leads were purchased by the buyer in the past day, week, month, and year, and the average cost of the leads. It displays the last ten (10) leads that were purchased. There is also a rating system available to the buyers. The community of buyers rates each seller using the star icons available on the partnership creation page. Their own rating is indicated by orange stars, the community's rating for the seller is indicated by grey stars;

A Sellers module is similar to the buyer's module however this module serves web content related to a sellers' account. It provides brief reporting such as how many leads were sold by the seller in the past day, week, month, and year, and the average sell price of the leads;

A Search module provides the search form accessible on their respective homepage, buyers and sellers are able to search through the leads they have bought and sold;

A Transactions module and reporting module serve web content related to transaction history. Transactions made between buyers and sellers are available on the transactions page. Transactions are viewable in one day, one week, or one month increments;

A User Modification module services user requests to modify their profile details;

A Lead module serves the purpose of displaying lead content (all information relating to a lead) to users that have bought or sold it. In addition, it accepts incoming leads from sellers who wish to sell a lead in the live auction platform, or directly to a dealer;

A Partnerships module serves web content relating to the partnerships that buyers and sellers have developed with each other. In addition, it provides a way for buyers and sellers to rate each other, and serves related content;

A Markets module serves web content related to market research data. Lead Bid Express provides market research so that users of the platform can get a good idea of how much they should pay for a lead originating from a certain market. The markets module main page displays a map of the country, and gives average lead prices for each state. Users may drill down to the state and metropolitan area view, to get average lead prices for those areas;

A Main module serves mostly static web content such as the home page; and

A Navigation module dynamically serves the navigation menu and is embedded into every page on the site.

A key component of present invention is that buyers are offered the hassle-free opportunity to "return" and dispute the validity of a lead they have purchased. For example, if the lead applicant has provided false or incorrect information on the application, the lead buyer may be unable to contact the applicant. In this case, the buyer will usually want to "return" the lead to the seller, and be given a credit for the price paid.

When a buyer views a lead they have purchased on the web site, they are offered the opportunity to return the lead. When they click the "Return Lead" link, they are presented with a web page which allows them to explain the reason that they are returning it. Once the return has been processed (a record of a new "return" transaction is made in the database), the lead seller receives notification of the return. The buyer is given a full credit for the purchase price of the lead, and the seller's account is debited for the amount of sale, and credited for the Lead Bid fee associated with the sale.

FIGS. 13-19

Figure 13:
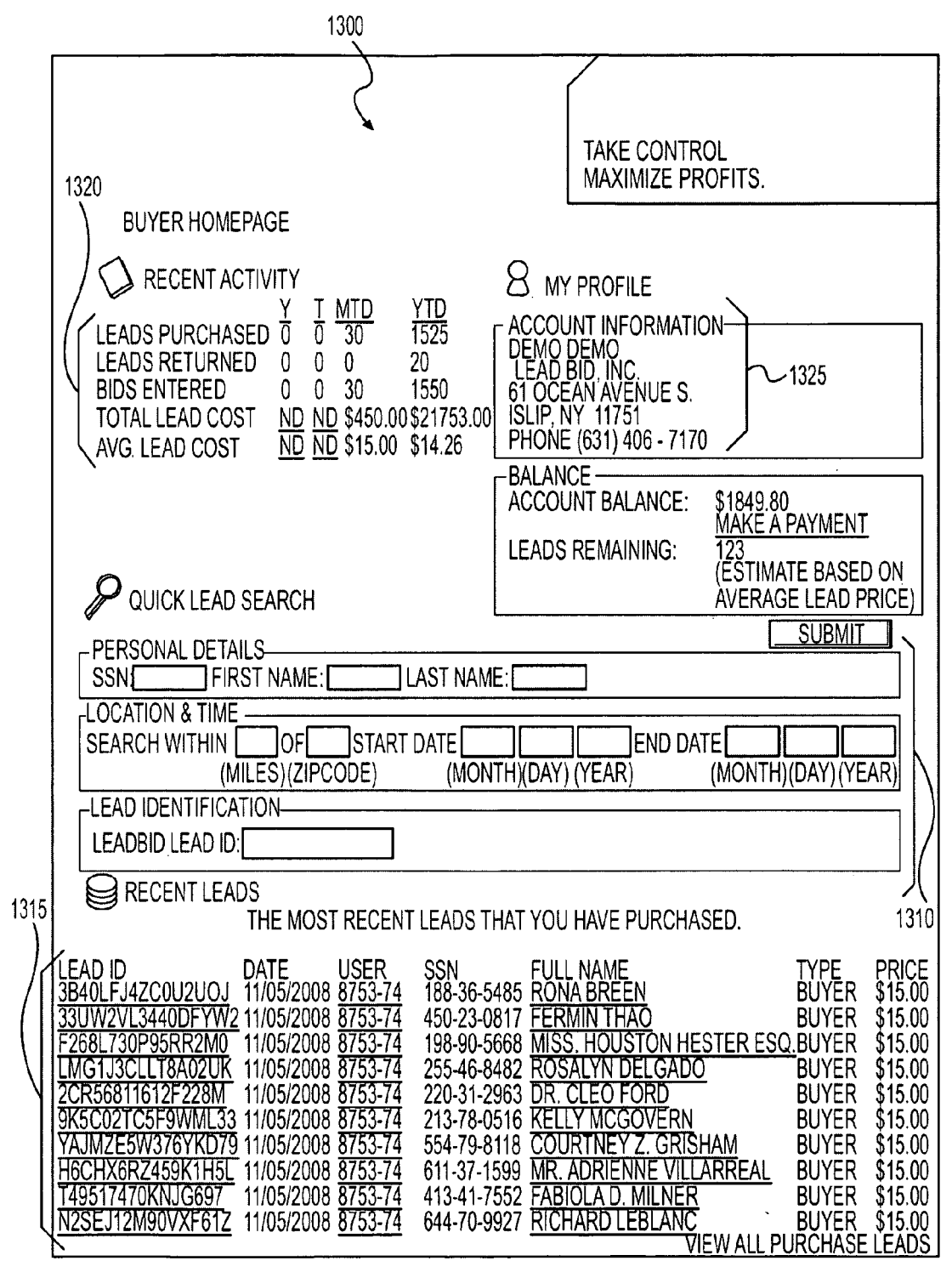

FIG. 13 is a screen shot from the Lead Bid website showing the Buyer Home page 1300. Buyer Home page 1300 includes a quick lead search area 1310 having various fields for searching leads including social security number (SSN) first and last name, as well as date limitations for search parameters. There is also a filed for daily sales lead activity 1320 and a personal profile area 1325. Recent lead are displayed in field 1315 and may include the date of the lead information, the type of lead (seller or buyer), and a listed price.

Figure 14:
FIG. 14 is a another web site screen shot showing a buyer partnership page according to one embodiment of the present invention.

FIG. 14 is a screen shot from the Lead Bid website showing the Buyer Partnership page 1400. Search Field 1405 allows a user to enter various information in an effort to search for buyer partners. Area 1410 includes all of the partnerships that a buyer may have lists the user name, company name, member history information, a seller rating scale and fields indicating whether the buyer has given publication consent and whether user had given publication consent.

Figure 15:
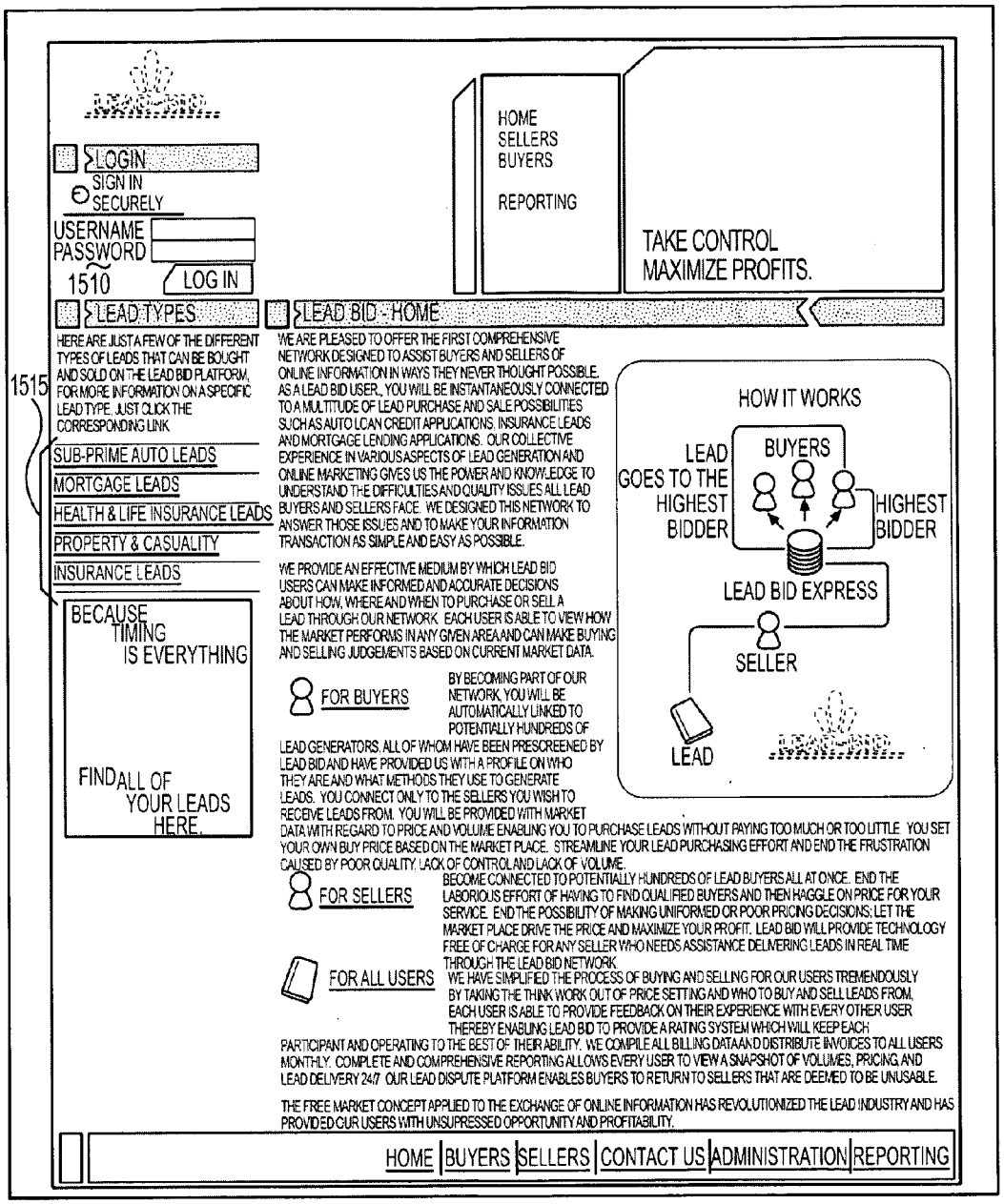
FIG. 15 is a another web site screen shot showing a home page according to one embodiment of the present invention.

FIG. 15 is a screen shot from the Lead Bid website showing the Home page 1500 where information is provided to users about the how users can utilize the present invention. Home page 1500 includes a security field 1510 for users to enter identification information and secure passwords. Additionally, hyperlinks 1515 may be included allowing a user to jump to specific pages as desired.

Figure 16:
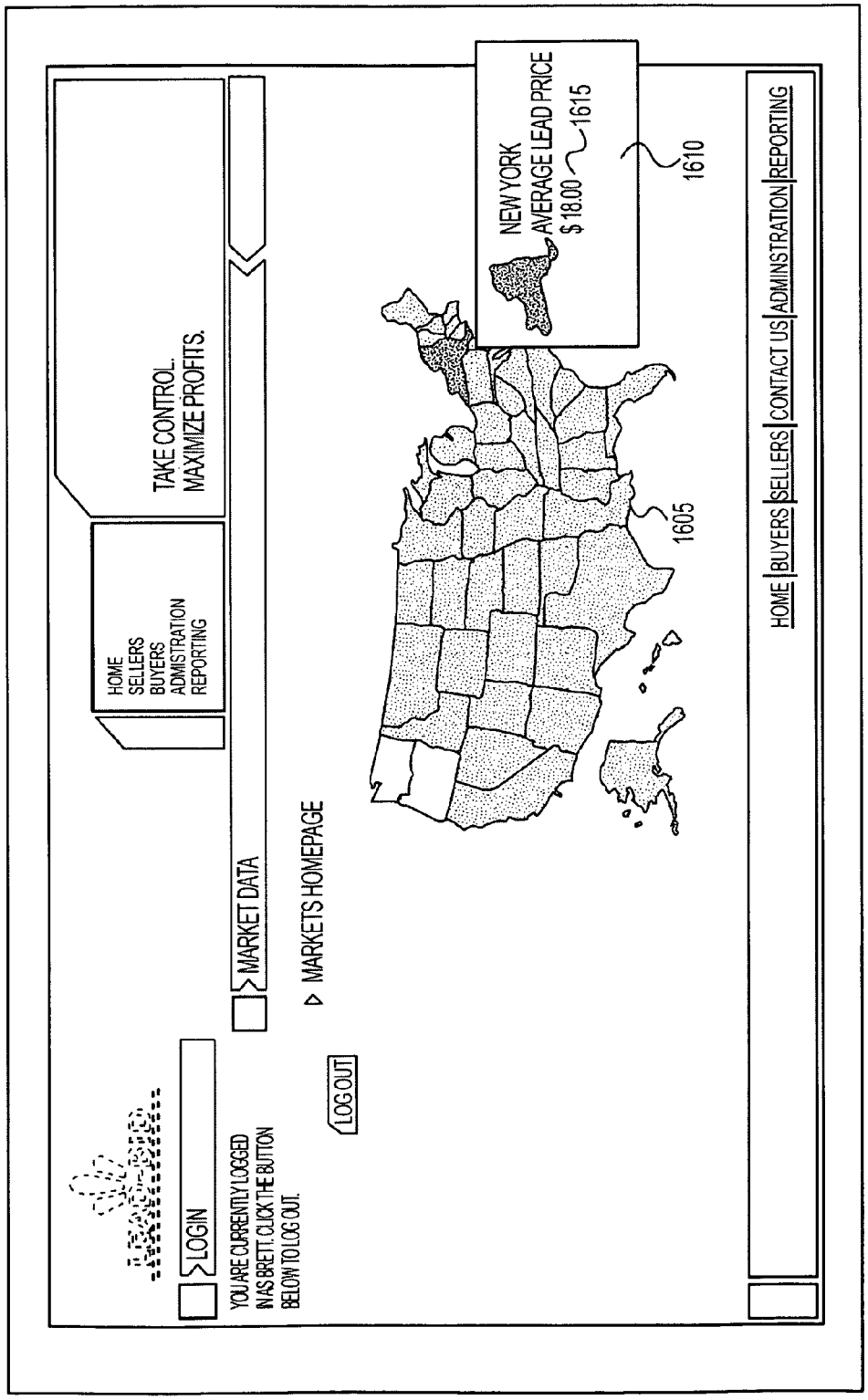
FIG. 16 is a another web site screen shot showing a market data page according one embodiment of the present invention.

FIG. 16 is a screen shot from the Lead Bid website showing the Market Data page 1600. Market data can include a map 1605 of the relevant jurisdiction where the buyer and or seller is seeking a lead. In this example the U.S. map is provided with an expanded sub-geographical area, 1610, in this case New York, and including field area 1615 displaying additional information about other leads in the relevant geographical area.

FIG. 17 is a screen shot from the Lead Bid website showing the Seller Home page 1700. Seller Home page 1700 includes a quick lead search area 1710 having various fields for searching leads including social security number (SSN) first and last name, as well as date limitations for search parameters. There is also a filed for daily sales lead activity 1720 and a personal profile area 1725. Recent lead are displayed in field 1715 and may include the date of the lead information, the type of lead (seller or buyer), and a listed price.

Figure 18:
FIG. 18 is another web site screen shot showing a seller partnership page according to one embodiment of the present invention.

FIG. 18 is a screen shot from the Lead Bid website showing the Seller Partnership page 1800. Search Field 1805 allows a user to enter various information in an effort to search for seller partners. Area 1810 includes all of the partnerships that a seller may have lists the user name, company name, member history information, a seller rating scale and fields indicating whether the buyer has given publication consent and whether user had given publication consent.

FIG. 19 is a screen shot from the Lead Bid website showing the Transaction page 1900. Page 19000 may include a reporting field 1905 where a user can customize report parameters. Field 1910 displays all leads in a report style as customized by the user and can include the date of the lead, the name of the lead, the type (seller or buyer). Other information displayed may include whether other parties are interest in the lead, the sell price, the transaction fees and the location of the lead. It is understood by those skilled in the art the other information may be displayed as needed or as customized by each user.

It will be apparent to one of skill in the art that described herein is a novel apparatus, system and method for internet based commerce for exchanging sales lead information in a bid process while preventing duplicate leads from being passed from one party to another. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A computer system comprising a hard drive, a microprocessor, a graphical user interface and at least one computer storage media programmed to execute computer program instructions, the computer program instructions to implement a method for exchanging online auction sales leads in real time between a buyer and a seller over an interconnected computer system including, selecting at least one buyer from a group of potential buyers;

collecting lead information for the selected buyer, including gathering and storing product information and buyer information;

verifying the lead information for the selected buyer;

determining whether the lead information for the selected buyer is either PING data or POST data, where PING data is determined, determining whether the lead information for the selected buyer is duplicative based upon the selected buyer's social security number, the age of the lead information for the selected buyer and whether the lead information for the selected buyer has been submitted in the previous 30 days with the same email address;

identifying at least one seller based upon a first set of predetermined criteria;

transferring seller lead information to the at least one buyer; and providing the selected buyer with seller information.

2. The computer system according to claim 1 further comprising the step of determining whether the selected buyer has a relationship with the seller.

3. The computer system according to claim 2 further comprising the step of determining whether the seller has elected to not conduct business with the selected buyer.

4. The computer system according to claim 1 where the step of selecting at least one buyer from a group of potential buyers includes determining whether each of the potential buyers has an active profile, whether each profile for each of the potential buyers contains bid criteria matching the seller and for the group of potential buyers, determining which buyer bid criteria contains a highest bid.

5. The computer system according to claim 4 further comprising weighting each of the potential buyers contains bid criteria.

6. The computer system according to claim 1 where the step of verifying the lead information includes determining whether lead constraint rules have been applied to the lead information.

7. The computer system according to claim 6 further comprising the step of determining whether the lead information for the selected buyer has been submitted in the previous 30 days with the home telephone number.

8. The computer system according to claim 7 wherein when POST data is determined, determining whether an email address or a home telephone number for the seller matches another lead.

9. The computer system according to claim 1 further comprising the step of rating the seller, buyers and the lead information.

10. The computer system according to claim 1 further comprising the step of returning process information to the seller.

11. The computer system according to claim 1 further comprising the step of parsing the lead information into a POST rule file for each selected buyer.

12. The computer system according to claim 11 further comprising the step of determining, for each POST rule, whether the POST rule has an alias.

13. The computer system according to claim 11 further comprising the step of determining, for each POST rule, whether the POST rule has a constant rule.

14. The computer system according to claim 11 further comprising the step of determining, for each POST rule, whether the POST rule is a regular expression.

15. An apparatus for exchanging sales leads in real time, the apparatus consisting of a computer system having a hard drive, a microprocessor and a graphical user interface, the apparatus comprising:

an internet based software application stored on the hard drive, the internet based software application for facilitating interactions between users and the apparatus;

a login module communicatively coupled to the internet based software application, where the login module contains a security element for allowing authorized users to access the apparatus;

an administration module communicatively coupled to the internet based software application, where the administration module contains software programmed to service internet web pages relating to the administration of the apparatus;

a bid module communicatively coupled to the internet based software application, the bid module structured and arrange to accept incoming bids from users;

a profiles module communicatively coupled to the internet based software application, the profiles module for storing and modifying user profiles on the hard drive;

a buyer module communicatively coupled to the internet based software application, the buyer module for providing web content for users;

a seller module communicatively coupled to the internet based software application, the seller module for providing web content for sellers;

a search module communicatively coupled to the internet based software application, the search module accessible by buyers and sellers and allowing such buyers and sellers to search the hard drive for information about each other;

a transaction module communicatively coupled to the internet based software application, the transaction module for storing transaction related information on the hard drive; and a lead module communicatively coupled to the internet based software application, the lead module containing lead content displayable to the buyers and sellers for determining whether the lead content for a selected buyer is either PING data or POST data, where PING data is determined, determining whether the lead content for the selected buyer is duplicative based upon the selected buyer's social security number, the age of the lead content for the selected buyer and whether the lead information for the selected buyer has been submitted in the previous 30 days with the same email address.

16. The apparatus according to claim 15 further comprising a markets module communicatively coupled to the internet based software application, the markets module for providing market research data to users.

* * * * *